United States Patent [19]
Danisch

[11] Patent Number: 5,633,494
[45] Date of Patent: *May 27, 1997

[54] FIBER OPTIC BENDING AND POSITIONING SENSOR WITH SELECTED CURVED LIGHT EMISSION SURFACES

[76] Inventor: Lee Danisch, P.O.Box 21029, Fredericton, New Brunswick, Canada, E3B 7A3

[*] Notice: The term of this patent shall not extend beyond the expiration date of Pat. No. 5,321,257.

[21] Appl. No.: 532,327

[22] Filed: Sep. 22, 1995

Related U.S. Application Data

[63] Continuation-in-part of Ser. No. 234,953, Apr. 28, 1994, abandoned, which is a continuation-in-part of Ser. No. 915,283, Jul. 20, 1992, Pat. No. 5,321,257, which is a continuation-in-part of Ser. No. 738,560, Jul. 31, 1991, abandoned.

[51] Int. Cl.$^6$ .................................................... H01J 5/16
[52] U.S. Cl. ........................ 250/227.16; 250/227.14; 385/13
[58] Field of Search ..................... 250/227.16, 227.14, 250/227.24, 227.31; 385/32, 39, 48, 13

[56] References Cited

U.S. PATENT DOCUMENTS

| | | | |
|---|---|---|---|
| 3,801,389 | 4/1974 | Fujimura | 156/6 |
| 5,005,005 | 4/1991 | Brossia et al. | 250/573 |
| 5,026,141 | 6/1991 | Griffiths | 250/227.15 |
| 5,321,257 | 6/1994 | Danisch | 250/227.16 |

*Primary Examiner*—Que Le
*Attorney, Agent, or Firm*—Paul Sharpe, McFadden, Fincham

[57] ABSTRACT

A curvature or bending and displacement sensor is composed of a fiber optic or light wave guide, for attachment to a member or members being curved or displaced. Light is injected at one end and detected at the other end. Curvature of the fiber results in light loss through an emission surface or surfaces, sometimes in conjunction with a superimposed curvature in a plane other than that of the curvature to be measured, this loss being detected. The loss of light detection is used to produce indication of curvature or displacement. The light emission surfaces extend in various forms, such as a surface strip or band. Particularly, in an example, the emission surfaces extend in a substantially peripheral direction, or in a substantially curved axial direction when in a curved portion of a curved guide. The placement, shape and configuration of the emission surfaces allows adjustment of the linear range of measurement, the overall throughput of light, and the length over which curvature is measured. Two or more light guides can be oriented to given indication of direction of curvature or displacement.

33 Claims, 28 Drawing Sheets

SECTION X-X

SECTION Y-Y

SECTION Z-Z

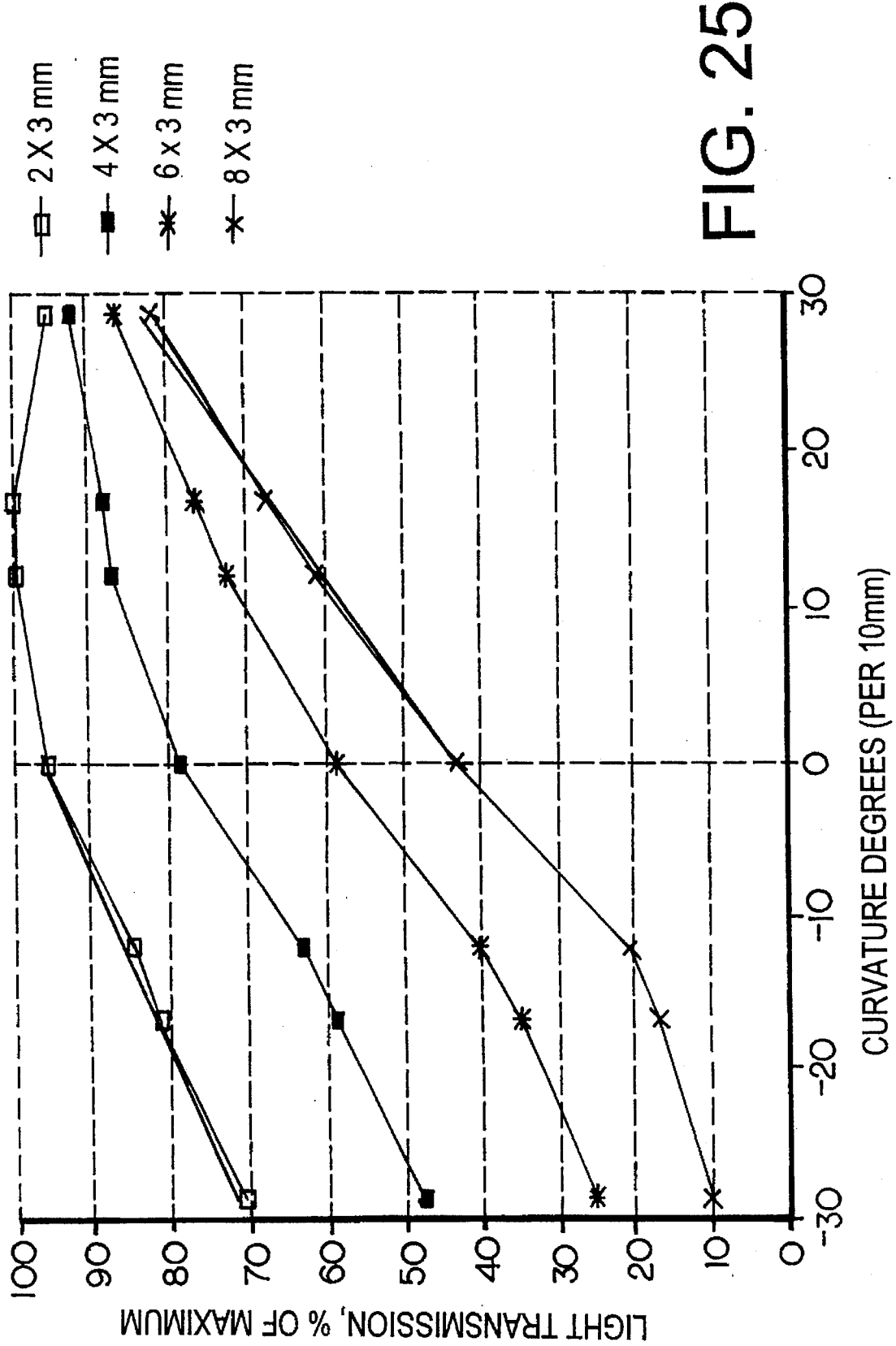

FIG. 27
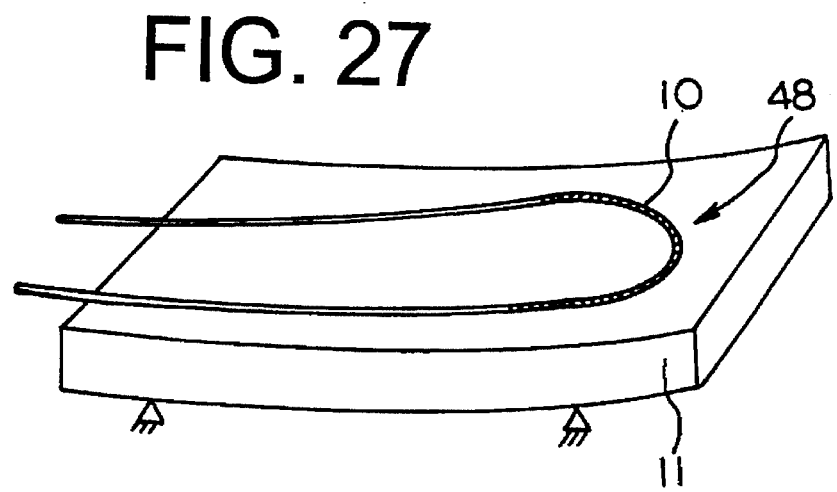
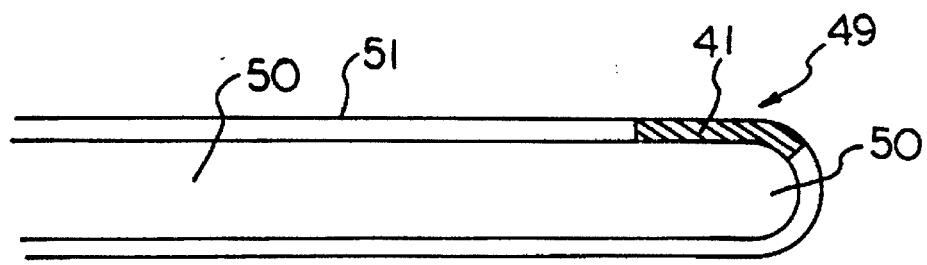
FIG. 28A
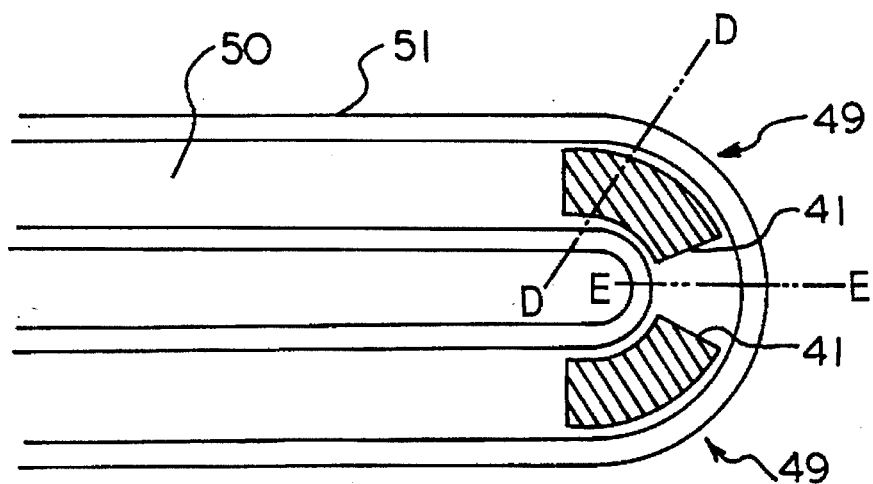
FIG. 28B

D-D

E-E

A-A

B-B

A—A

B—B

C—C

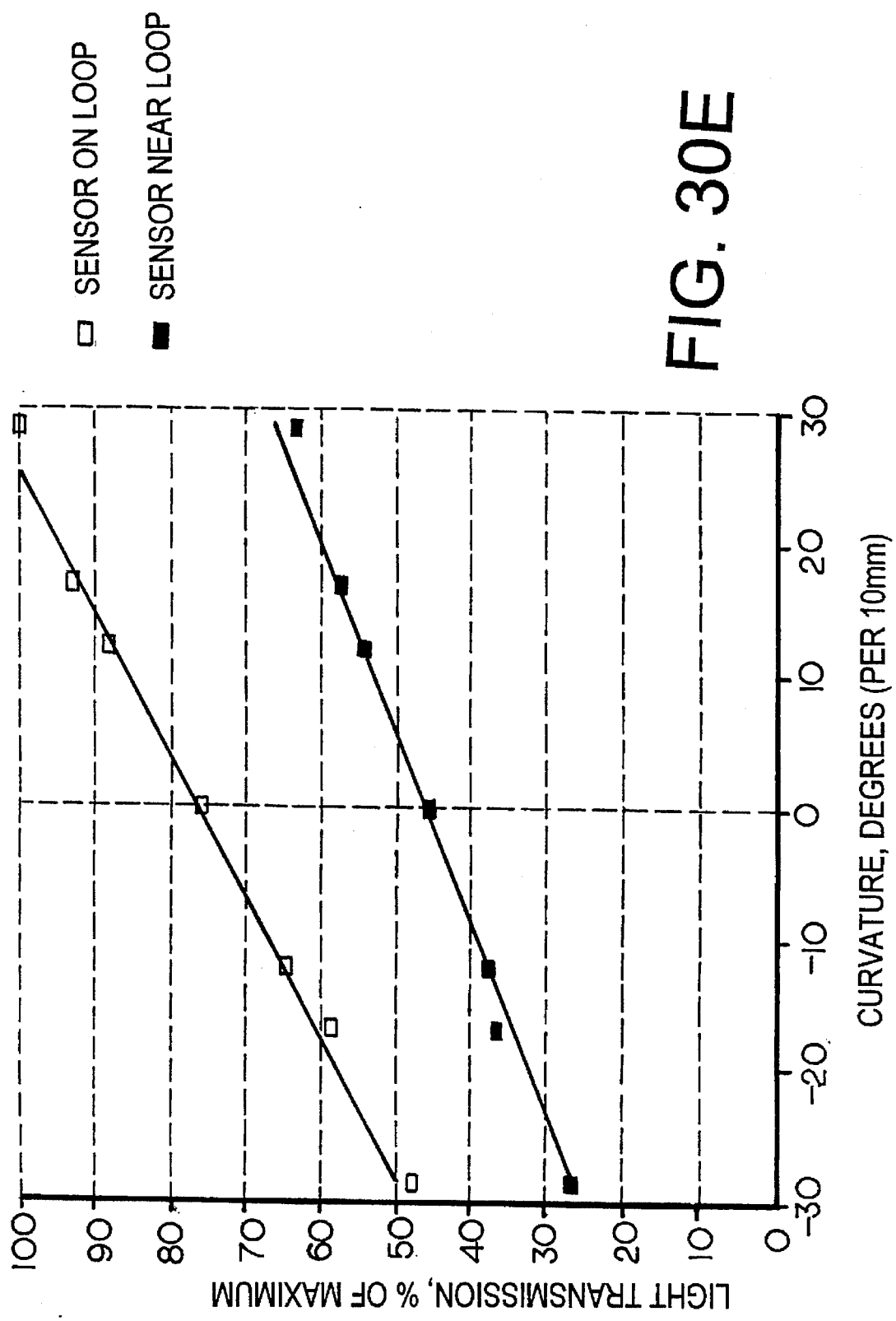

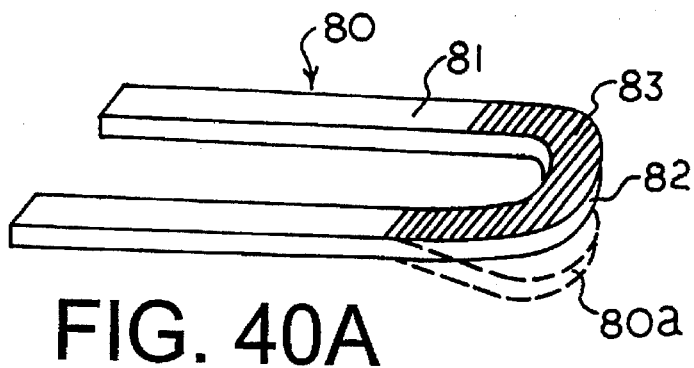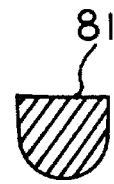
FIG. 40A  FIG. 40B
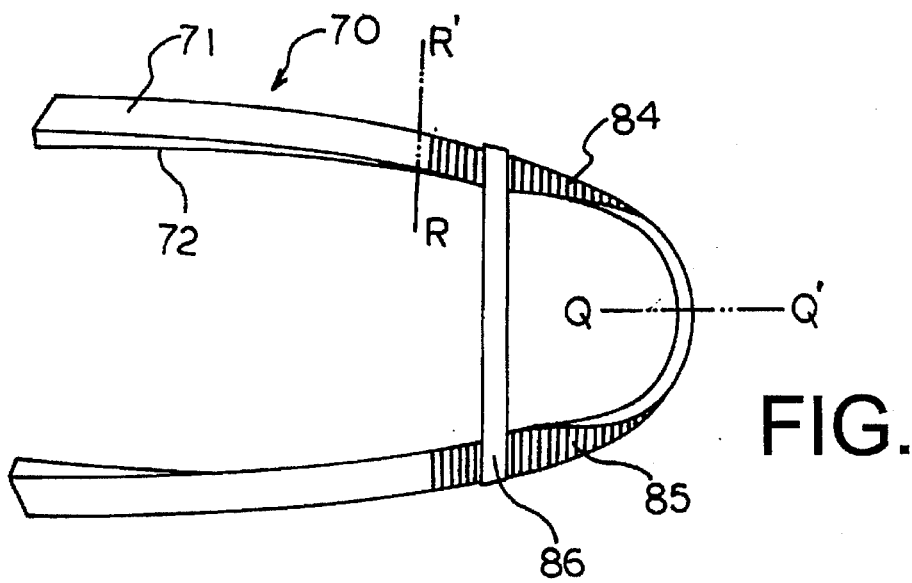
FIG. 41
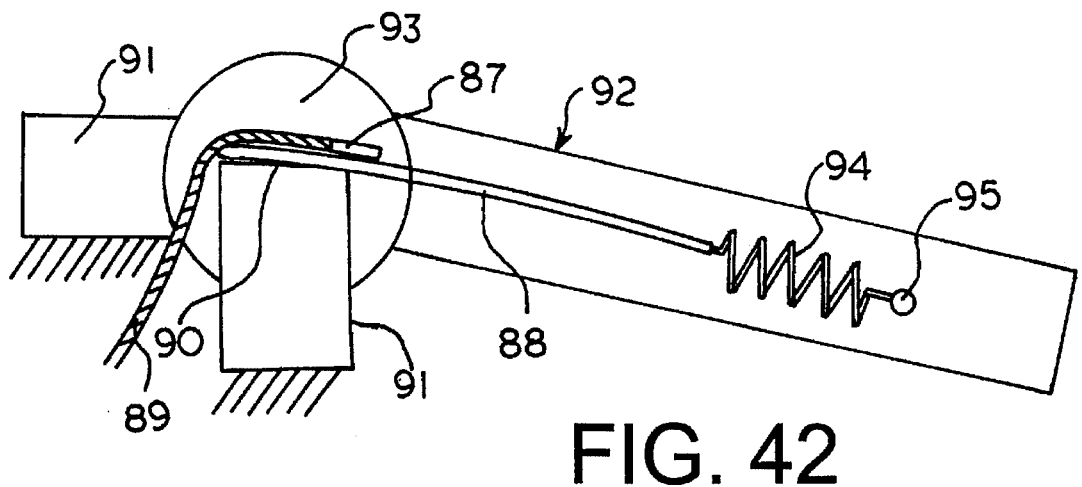
FIG. 42

FIBER OPTIC BENDING AND POSITIONING SENSOR WITH SELECTED CURVED LIGHT EMISSION SURFACES

This is a continuation-in-part of application Ser. No. 08/234,953 filed Apr. 28, 1994, abandoned, which in turn is a continuation-in-part of application Ser. No. 07/915,283 filed Jul. 20, 1992, now issued U.S. Pat. No. 5,321,257, which in turn is a continuation in part of application Ser. No. 07/738,560, filed Jul. 31, 1991 (now abandoned).

BACKGROUND OF THE INVENTION

Field of the Invention

Various methods exist for measuring strain, curvature or displacement of materials or structural members. One well-known method is to measure stress on or in the members using resistive strain gauges arranged on the surface in patterns such that the bending can be inferred from a knowledge of the modulus of elasticity of the member. Under some conditions it is advantageous to measure stress or deformation using optical fibers. Fibers are ideal for many applications because they can be relatively inert to environmental degradation, are light in weight, are not affected by electromagnetic interference, carry no electrical current, and can be very small and flexible, thus having little or no effect on the structure in which they are embedded. It is possible to either cement fibers to surfaces or to embed them inside, such as in fiber/epoxy composites, concretes, or plastics.

Many types of optical fiber sensors have been developed for the measurement of stress and position. Most employ interference techniques to measure changes in length or bend radius of the fiber. Most of these techniques rely on detecting standing waves set up in the fiber by reflecting part of the light back from its distal end. These techniques are very sensitive (comparable to strain gauges) but require complex and expensive measurement techniques such as interferometry or optical time domain reflectometry (OTDR) for their execution. Measurements are very sensitive to changes in temperature, requiring elaborate compensation techniques. Another limitation of many of the interference techniques is insensitivity to direction because the measurement is made by counting the number of interference peaks due to distortion of a fiber. Thus, for example, shortening of the fiber is indistinguishable from elongation, or bending up is the same as bending down; unless the fibers are arranged in appropriate curves or other special geometric arrangements.

Equipment for performing interference measurements tends to be bulky and expensive, requiring frequent adjustment. It must be capable of distinguishing peaks at spacings of the order of 0.5 to 1 micron or less. This has limited most fiber optic stress measurements to tests which can be performed under carefully controlled laboratory conditions.

Non-interference techniques can be used to measure bending in fiber optics. It is well known that light leaks out of the core of an optical fiber if it impinges on the cladding at a sufficiently large angle with respect to the long axis of the fiber. For every fiber, there is a critical angle dependent on the indices of refraction of core and cladding, beyond which light will escape. If the fiber is bent, some of the light in the core will exceed this angle and escape. This effect has been used to build "microbending" sensors, which simply measure the percentage of transmission of light down a fiber. These suffer from relative insensitivity (little light is lost) at small angles. Usually a microbend sensor consists of a fiber placed in a corrugated fixture such that a force applied to the fixture will create many sharp bends in the fiber. Microbend sensors are used to measure pressures, forces, and displacement. These sensors also do not measure the direction of the force unless pre-tension is applied.

Other fiber optic sensors have been constructed in which the cladding is removed from the core, or the cladding and some of the core are etched away. These sensors may be more sensitive to bending than untreated fibers, but, like other bending sensors mentioned above, give no information about the direction of a bend unless they are bent at rest. They are thus unsuitable for incorporating in a simple manner in composite structures containing many parallel fibers with sensory and structural properties.

Other fiber optic sensors have been constructed which use thin films in place of the cladding, to give location information based on the wavelength of the filter produced by the thin film. This technique shows no improvement in sensitivity over other fiber optic sensing techniques, so interference techniques must be used to obtain useful outputs.

Many sensors are based on measurements of strain, which is basically an elongation of material. Although it is possible to use multiple strain gauges to infer curvature from strain, it is more desirable in many circumstances to measure curvature directly. Often, it is desirable to mount a sensor near the neutral axis of a beam, where there is no strain associated with curvature of the beam. Often, curvature is the parameter of direct interest, such as when measuring deviation from straightness in a pipe or rod. It is also frequently desirable to measure displacement between two structures, which can be inferred from the curvature of a flexible beam or fiber connecting them. Just as strain gauges can be used to infer curvature in some circumstances, curvature sensors can be used to infer strain.

Strain gauges have found wide application in a huge variety of measurement tasks; curvature sensors potentially have just as many applications. The following examples cover only some of the potential applications for fiber optic curvature and displacement sensors: measuring flutter and deflection in aircraft wings and aerospace truss structures; measuring deflections on cranes and lifting devices; measuring movement of bridges, dams, and buildings due to earthquakes, settlement, or other degradation; measuring sag and deflections of pipes, rods, cables, and beams; measuring the effects of frost heave on roadways and runways; sensing traffic movements and soil settlement; measuring wind forces on masts and towers; sensing parameters of sports equipment including skis, poles, shoes, fishing equipment, swords, bats, clubs, balls and clothing; measuring deflections on marine equipment including masts, spars, cables, hull plates, struts, and booms; measuring curvatures of vanes, wires, poles and other flexible structures or probes to infer fluid or slurry flow, speed, and direction of movement; measuring vibration and sound levels by means of flexing beams, fibers, or diaphragms; measuring pressures by sensing the curvature of diaphragms or tanks; measuring acceleration in general; measuring deceleration and associated forces for the deployment of airbags; measuring the deflection of support structures to infer applied weight, forces, torques, and deflections; forming multi-degree-of-freedom force and torque sensors; forming input devices for computers including joysticks, keyboards, and levers; measuring joint angles and deflections on robots, automatically guided vehicles, automobiles, trucks, tanks, earth moving equipment, loaders, cranes, ships, airplanes, helicopters, and spacecraft; measuring the deflections of tire treads and other rubber or elastomeric moving parts; measuring door and wheel positions; measuring pedal, vane, rudder, lift surface, and valve positions; measuring shaft and knob angles, rotations, and positions; measuring liquid levels by deflection of floats or bladders; measuring alignment of automotive, marine, or industrial equipment; measuring positions and motion of reclining seats, chairs, beds, and medical fixtures; instrumenting medical tools; instrumenting prosthetic devices; measuring deflections in the presence of high magnetic fields; measuring magnetic and electric fields by virtue of forces or motion generated in magnetic or electric media attached to a curvature sensor; measuring concentration or presence of liquids, gases, and vapours by virtue of dimensional changes induced in a substrate to which the curvature sensor is attached; measuring temperatures by virtue of dimensional changes induced in a substrate to which the curvature sensor is attached; measuring positions and angles of parts of animal, including human, bodies; and many others.

Generally, fiber optic sensors that must be exposed to harsh environments or that must be embedded, should be intrinsic sensors, that is, sensors that do not rely on light leaving and then reentering the fiber. Thus, sensors that involve light exiting a fiber, reflecting off a surface, and re-entering are not desirable for many purposes because the surfaces may become contaminated, thus changing the light intensity.

A wide variety of intrinsic fiber optic sensors has been described, most of them based on interference techniques. Interference-based sensors, which rely on mechanical changes to the fiber dimensions producing changes in light interference patterns within the fiber, are very sensitive to strain but also to temperature and involve complex and expensive electronic circuitry. Another drawback is that usually lasers or laser diodes must be used as light sources with these sensors, thereby limiting their durability and longevity, and increasing their cost.

Optical fibers transmit light by virtue of total internal reflection. The light is contained in a core of transparent material. Generally, this core is covered with a cladding layer that has a lower index of refraction than the core. Because the index of the cladding is lower than that of the core, rays within a certain range of angles of incidence with the core/cladding boundary will be refracted back into the core upon striking the cladding. If the fiber is bent in a curve, small amounts of light are lost due to changes in the angle of incidence at the curved core/cladding boundary. If the curvature becomes substantial, significant amounts of light may be lost. Fibers with a discrete core/cladding boundary are called step index fibers. Other fibers called graded index fibers do not have a distinct boundary between core and cladding, but exhibit a continuous decrease in index of refraction toward the outer circumference of the fiber. For simplicity, this description will use terminology consistent with step index fibers, but graded index fibers may be similarly treated, as may other light guides including guides of non-circular cross section including, for example, a D-shaped cross-section, rectangular and other polygonal cross-sections, and of guides with gas or liquid surrounds instead of conventional solid cladding. It is also possible to use metal-covered fibers.

"Microbending" sensors are designed to take advantage of this loss mechanism. They generally involve a mechanical structure such as a serrated plate that presses on the fiber, producing a series of substantial local curvatures (bends). The loss of light is used as a signal to indicate displacement of the mechanical structure. Microbending sensors generally do not have a linear loss of light energy in response to changes in curvature, and are otherwise undesirable because of the necessity for a mechanical structure, and the strain which it imposes on the cladding and core of the fiber during deflection. If fibers are used without a mechanical structure to translate displacement into large local curvature, then the light loss due to bending is sufficiently large to be of practical use only when the bending is large. For small bends, such unenhanced microbending sensors are not useful because inadvertent bending of the fiber optic leads carrying light to and from the sensor portion of the fiber will produce changes in light loss that are indistinguishable from those produced by bends of the sensor portion. For these reasons, microbending sensors are generally not used in embedded applications, and rarely are used for measurements of curvature.

It is possible to treat optical fibers so that the amount of light travelling through the core changes more than usual with changes in curvature. Methods generally involve modification of the cladding so that it loses more light than usual over a short length. When straight, more light than usual is lost over the treated zone. When bent, additional amounts of light are lost due to the greater interaction of the treated sides with the light travelling through the fiber. Methods of treatment include abrasion, etching, heat treatment, embossing, and scraping of the cladding. Such treatment can produce a loss of light that is linear with curvature over a wide range, and which is much greater, by orders of magnitude, than the loss produced by microbending or by inadvertent bending of the leads carrying light to and from the sensitized zone.

A drawback of the above method of treatment is that loss is introduced even for a straight fiber, and the modification of the cladding can weaken glass fibers, especially if it involves removal of cladding around the entire circumference of the fiber.

It is undesirable to produce excessive light losses. If loss through the fiber is minimized, it is possible to use an inexpensive light emitting diode as a source of light, and to use inexpensive photodetectors and amplifiers to detect the amount of light being transmitted through the sensor. For this reason, it is desirable to make sensors with as little loss as possible when at the maximally transmissive end of their range (low residual light loss), but with as large a loss as possible due to a change in curvature (high sensitivity). Preferably, the loss should be a linear function of curvature, with the centre of the linear range being at the centre of range of the mechanical quantity (such as curvature or displacement) being measured. These requirements often cannot be met with known sensors, because parameters such as residual light loss and sensitivity cannot be varied independently. For instance, sensitivity to curvature increases as the length of the treated zone is increased, but so does residual light loss.

Harvill et al. (U.S. Pat. No. 5,097,252) have described intrinsic fiber optic sensors with the upper surface of the fiber treated to sense bending of fingers and other body parts. Although a monotonic output is claimed, the range of which includes a straight (zero curvature) sensor, the output is not linear and the range is not centred about zero curvature. Danisch (U.S. patent applications Ser. No. 07/738,560 filed on Jul. 31, 1991, and entitled Fiber Optic Bending and Positioning Sensor and Ser. No. 07/915,283 filed on Jul. 20, 1992, and having the same title, each naming Lee Danisch as the inventor, and further described in "Bend-enhanced Fiber Optic Sensors," SPIE: The International Society of Optical Engineering, L. A. Danisch, Volume 1795, 204–214, September, 1992, Boston, Mass., U.S.A.; "Smart Bone,"

Final Report for Canadian Space Agency Contract 9F006-1-0006/01-OSC, L. A. Danisch, 24 pp., June, 1992; and "Smart Wrist," Final Report for Canadian Space Agency Contract 9F006-2-0010/01-OSC, L. A. Danisch, March, 1993 has described fiber optic sensors with a surface of the fiber treated to emit light at a side with a minimal loss of throughput by means first described in U.S. Pat. No. 4,880,971, also in the name of Lee A. Danisch. The Danisch prior art includes descriptions of linear responses for a wide range of curvatures, a response that drops off as a cosine function for bends in planes not in the plane of maximum sensitivity, and a range centred about zero curvature. Another feature is a light absorbing coating which reduces or eliminates extraneous responses, including non-linearity. Control over the positioning of the centre of the range would open the possibility of mainly using the portion of the range with the highest light throughput (lowest loss), rather than that with the lowest throughput (highest loss) as taught in Harvill. This would be especially useful if the centre could be adjusted without affecting the residual light loss or sensitivity, or adversely affecting the strength of the fiber. The prior art does not teach how this can be done. The prior art describes sensors for which it is possible to vary the length, width and shape of a single treated strip, or the depth of multiple notches. Danisch, (U.S. Patent filings above) describes long sensors ". . . formed by alternating lengths of fibers with an emission strip with lengths of fully clad fibers." However, it is not shown how this technique can be used to gain control over the placement of the centre of the linear range.

A complicating factor in the manufacture of treated fiber optic sensors is that if their response to curvature is maximum in a given plane due to treatment not including the entire circumference of the fiber, then it can be difficult to maintain a proper orientation of the plane of maximum sensitivity after treatment but before embedment of the fiber. The main problem is the ease with which the fiber can twist about its long axis due to torques applied at any point along the length of the fiber. This is a problem for any fiber whose complete circumference is not treated, including fibers that are treated at both the top and bottom, thus having a response characteristic that does not distinguish upward from downward bends, but that distinguishes (through a cosine law) between up/down and left/right bends.

Another complicating factor in the design of many intensity-based fiber optic sensor system is the need for a return path and a means of reflecting or turning the light at the end of the fiber run.

To eliminate the need for a turnaround and return path, a coupler is often used at the measurement end, such that light can be injected into a single fiber with a reflector at the end. Injected light travels through the treated portion of the fiber, is reflected at the end, and returns to the coupler in the measurement system in the same fiber. The coupler is designed to extract the return light only, passing it on to a photodetector and amplifier. Unfortunately, the coupler introduces large losses and can be expensive to manufacture. Also, the reflective structure at the end can be lossy and difficult to manufacture.

In other cases, it is acceptable to use a return fiber with a reflective structure placed near the ends of the sensor and return fibers, whose distal ends face or are inserted into the reflective structure. Such a solution generally involves light leaving and re-entering the fibers, so that the sensor is no longer an intrinsic one, or it involves losses that may be unacceptable. It also invariably involves a reflective structure that is larger than the diameter of a single fiber or even two fibers, and is thus unacceptable for embedment.

A disadvantage of a turnaround loop at the distal end of a fiber optic sensing system is that even if sufficient width is available for the turnaround, it requires adding extra length to the system beyond the location of the sensor. This increases the size of the system and prevents sensing at the distal end of the system. For instance, it may be desirable to measure changes in curvature at the top end of a non-hinged but flexible lever which is being used as a "joystick" form of input device for a computer. If a turnaround loop is used for a fiber that enters the lever at the bottom, it would normally be at the top of the lever, thus not allowing known forms of curvature sensors to be placed at the top. As another example, if a turnaround loop is used and it is desired to measure curvature at the centre of a curved beam, then the beam must be long enough to accommodate the turnaround.

Another disadvantage of the turnaround is that it must be held in position to avoid changes in light intensity due to changes in curvature within the plane of the turnaround, particularly if the turnaround has a small radius of curvature which is producing light losses substantially greater than those of a straight fiber. If the turnaround is rigidly affixed to the substrate, this may produce stresses on the fibers between the turnaround and the location of the sensitized zone, which must also be rigidly attached to the substrate in order to properly sense its curvature.

However, if the disadvantages of the turnaround can be overcome, it has overwhelming advantages in terms of cost of manufacture, small size, lack of complexity, and relatively low light loss.

The present invention provides an improved sensor means for sensing curvature and displacement with minimum manufacturing cost and minimum damage to the fiber.

An object of the present invention is to provide a sensor means which minimizes residual light loss while optimizing sensitivity and preserving the strength of the fiber.

A further object of the invention is to provide a sensor means which allows maximum utilization of the portion of the linear range exhibiting the greatest transmission of light through the fiber.

A further object of the invention is to provide a sensor means that allows achieving a given residual light loss and sensitivity over a range of sensitized zone lengths.

A further object of the invention is to provide a sensor means which allows placing the sensitized zone of the sensor near the distal end of the sensor system.

A further object of the invention is to provide a sensor means which maintains the orientation of the sensitized zone, once treated.

SUMMARY OF THE INVENTION

This invention achieves these and other results by providing a treatment means that minimizes residual loss and maximizes the effect of mechanical curvature of the sensor on the transmission of light through the fiber.

In one embodiment of the present invention, the sensor zone is made up of alternately treated and untreated portions of the fiber. There is opportunity for many light rays to refract toward the core from untreated spaces between treated ones so that average curvature may be sensed over a long length of the fiber without introducing unnecessary residual loss. The treated portion or portions may involve modification of the fiber for its entire periphery or a part of the periphery. Treatment may include abrasion, etching, repeated notching within the band, heating, chemical removal, and others. Treatment is generally accompanied by application of at least a thin layer of light absorbing material.

In another embodiment of the present invention, treatment of portions of the fiber mentioned above involves modification of only a portion of the periphery, these portions being oriented on the side of the fiber that is concave outward over a desired range of curvatures. By varying the lengths of treated and untreated strips, and the number of strips, and the extent of the periphery treated by each strip, the size of the linear region of sensitivity for concave bends can be increased, so that the sensor is operated near its maximum throughput condition. This embodiment has the advantage of allowing operation of the sensor within its highest linear throughput range, and controlling the size and placement of the centre of that range, while maintaining linearity of response to bending and displacement. The method has the advantage of being able to produce a sensor that has a minimum amount of periphery treated, while still providing maximum sensitivity and throughput over a desired range. This is important to maintaining the strength of the fiber used, especially when glass fibers are being treated.

In another embodiment of the present invention, the turnaround at the distal end of the fiber sensor loop is treated to be sensitive to bending, such that the treated portion has a minimal effect on throughput of the turnaround, but the sensitivity to bending is the same or improved over that of a sensitized zone placed on a straight portion of the fiber. In this case, the net throughput of the sensitized zone and the loop combined can be made greater than for a sensor fiber in which the zone and loop are separated. The sensitized turnaround loop makes it possible to sense curvature at the free end of a structure, and has the added feature that if the turnaround loop is heat-formed or constrained by a form or fixture, it forms a plane that is always orthogonal to the plane of maximum sensitivity of the sensor, so that it is easy to maintain orientation of the maximum sensitivity plane during manufacture. The structure also lends itself to easier manufacture, because the turnaround forms the distal end of the fiber loop, and can easily be inserted into a machine for heat treatment, embossing, sanding, or other operations. This is not the case for a fiber which must be treated at some arbitrary location along its axis, especially if it must be inserted into an oven for heat treatment, without involving the leads in the treatment. This embodiment can be used with various forms of treatment, including treatment of various portions or all of the circumference.

The invention may be defined as a fiber optic curvature and displacement sensor comprising a fiber optic light guide having at least one light emission surface extending, for part of the length of the guide, in a direction selected from: a substantially circumferential direction, and a substantially curved axial direction when in a curved portion of a curved guide.

In one preferred embodiment, the light emission surface is in the form of a plurality of circumferentially-oriented bands.

In another preferred embodiment, the light emission surface is in the form of at least one ring around the circumference.

In a further preferred embodiment, in a fiber having a rectangular cross-section, the light emission surface is on one of the sides of the rectangle, or on opposed sides of the rectangle. Preferably the rectangle is oblong, with the light emission surface or surfaces on one or both longer sides, respectively.

Preferably the light emission surfaces are positioned to give the most desirable orientation to the maximum sensitivity plane.

The fiber optic light guide may be in the form of a loop, the loop having at least a substantial portion of the light emission surface or surfaces therein. These latter surfaces preferably are in a configuration selected from peripherally-oriented bands grouped on an inside or concave portion of the curvature of the loop, and axially-oriented bands substantially parallel to the plane of the loop and substantially following the curvature of the loop.

In one preferred embodiment, from three to five circumferentially-oriented bands are grouped together with the bands each extending for about 60° to about 90° of circumference. In the case of axially-oriented bands, preferably from two to six curved bands are either coplanar or in parallel planes. The invention includes sensors in which the fiber optic light guide, or portion thereof, is in the form of a single fiber which, serves both to illuminate the light emission surface or surfaces, and to collect illumination which has passed the light emission surface or surfaces, the illumination end and collection end of the fiber being located in a single region removed from the light emission surface or surfaces.

In a further preferred embodiment, the fiber is in the form of a flat strip, having a generally rectangular cross-section having spaced parallel opposed wide sides. The light emission surface or surfaces are formed on one or both of the wide sides. In particular, the light emission surface or surfaces are formed at a bend in the fiber, or may include both axes. The bend may be in the plane of the wide axis of the fiber, or in the plane normal to the wide axis of the fiber. One example of a strip-type fiber is one formed from a strip of polymer material, such as is sold under the trade name Mylar.

Yet a further preferred cross-section can be a D-shaped cross-section, with the light emission surface being on the flat side of the D. Normally the fiber will be bent in the plane of the flat side. Other cross-sections and arrangements can be provided.

The invention includes, in a vehicle suspension system which includes an electronic system for sensing displacement between a vehicle body or frame and a vehicle wheel system and comprises a suspension sensor, the improvement comprising a flexible beam and a fiber optic curvature and displacement sensor mounted to the flexible beam, the sensor comprising a fiber optic light guide having at least one light emission surface extending, for part of the length of the guide, in a direction selected from: a substantially circumferential direction, and a substantially curved axial direction when in a curved portion of a curved guide.

The invention also includes a method of sensing curvature and displacement, of an elongate member, comprising attaching a fiber optic light guide to the member, the light guide having a light emission surface extending, for part of the length of the guide, in a direction selected from: a substantially peripheral direction, and a substantially curved axial direction when in a curved portion of a curved guide, the light guide extending along the member; injecting a light beam into one end of the light guide, detecting the light beam at the other end of the light guide, measuring the difference in the light beam between the one end and the other end, indicating curvature or displacement, of the member.

Preferably the method includes selecting the light guide so as to optimize sensing of curvatures over a range that includes, as a substantial portion of the total substantially linear range sensed, curvatures that produce increasing transmission of light with increasing curvature.

Preferably the method includes attaching a plurality of fiber optic light guides to the elongate member, each having a plurality of light emission surfaces such that the planes of maximum sensitivity of the guides are at different angles from each other so that at least one guide maximally indicates curvature at a unique planar inclination.

A preferred arrangement may utilize two to six fiber optic light guides oriented in different directions at predetermined angles relative to each other.

BRIEF DESCRIPTION OF THE DRAWINGS

The invention will be readily understood by the following description of certain embodiments, by way of example, in conjunction with the accompanying drawings, in which:

FIG. 25 shows a family of curves showing light loss through a fiber treated with successively more emission surfaces, as it is bent over a wide range of curvatures;

FIG. 27 shows a sensor system including a loop of fiber used to return light to the optoelectronic measuring system. The loop is treated to act as a sensor and is mounted to a bending beam to measure curvature near the end of the beam;

FIG. 28A is a longitudinal section of the loop in FIG. 27. The top portion of part of the cladding in the loop has been removed to allow light to escape in two patches on a side of the fiber. The patches are located on curved portions of the loop;

FIG. 28B is a plan view of the fiber in FIG. 28A;

FIG. 30E shows sensor loss due to curvature for a fiber loop with two emission surfaces, and for a similarly treated straight section of fiber;

FIG. 40A is a perspective view of a sensor having a D-shaped cross-section;

FIG. 40B is a cross-section of the sensor of FIG. 40A;

FIG. 41' is a graph of light transmission through a loop sensor made of light guide with a rectangular cross-section; and FIG. 42 illustrates a means of attachment useful in sensing angular displacement.

DESCRIPTION OF THE PREFERRED EMBODIMENTS

FIGS. 1 to 21, illustrate various forms of sensors, associated electronic circuitry and output curves as claimed in above-mentioned application Ser. No. 07/915,283.

Figure 1:
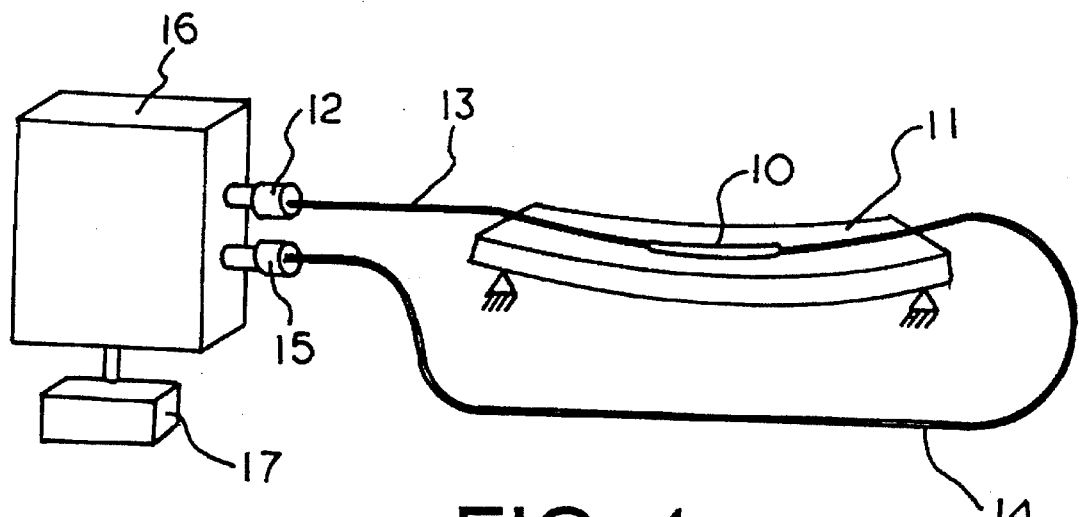
FIG. 1 is a diagrammatic illustration of a bending sensor apparatus, with the sensor shown cemented to a bending beam.

FIG. 1 illustrates a bending sensor 10 mounted with adhesive on bent beam 11. In the example, light is conveyed from a photo-emitter 12 through a plastic or other optical fiber light guide 13 to the sensor portion 10, and thence through guide 14 to a photo-detector 15. The light guide near the sensor region 10 has had its outer protective jacket removed, and the light conducting core exposed along a strip on the surface; portions 13 and 14 leading to the sensor region may have the jacket in place. The sensing portion 10 is adapted to sense bending. The photo-emitter 12 and photo-detector 15 are part of an electronic measuring system 16 and display 17.

Figure 2:
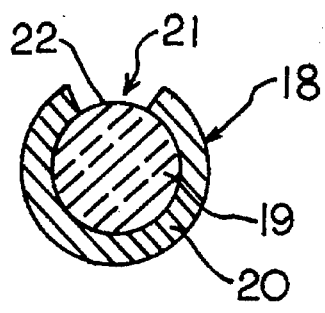
FIG. 2 is a cross-section through an optical fiber in accordance with the present invention.

FIG. 2 illustrates, in cross-section a conventional optical fiber wave guide 18 having a light conducting fiber 19 and a cladding 20. Normally there will be a buffer layer and a coating layer also. The cladding is removed locally, at 21, extending in a band along the fiber 19, to form a light emitting surface 22. The band can be formed by deliberately removing cladding as by abrasion, melting, etc. or by displacement as by pressure or rubbing on the fiber, for example by a heated tool, depending upon the particular form of fiber.

Figure 3:
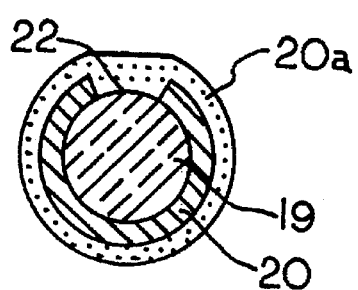
FIG. 3 is a cross-section similar to that of FIG. 2, illustrating a modification thereof.

FIG. 3 illustrates a modification of the arrangement of FIG. 2, in which the light emitting surface band 21 is covered with a light absorbent material 20a. Typical materials for the coating 20a are graphite filled epoxy resin, dye-filled resins and similar materials. The use of the coating 20a prevents emitted light interfering with any other instrument or structure and also prevents any back reflection into the fiber, which would affect the measurements. The additional coating 20a can be applied only over the band 21, but more commonly is applied around the entire fiber.

Figure 4:
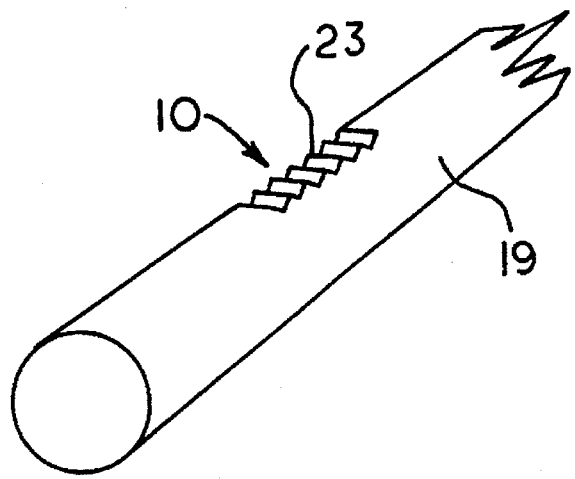
FIG. 4 is a perspective view, on a large scale, of part of a light guide showing a form of surface treatment.
Figure 5:
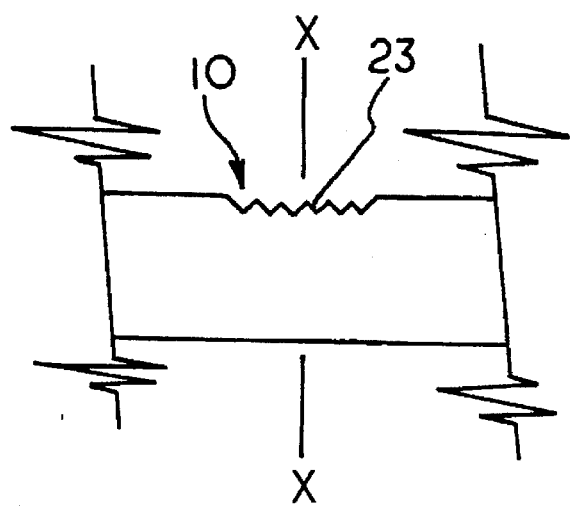
FIG. 5 is a side elevation of the light guide of FIG. 4.
Figure 6:
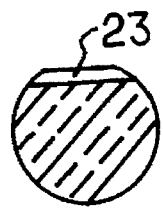
FIG. 6 is a transverse cross-section of the sensor as on line X—X in FIG. 5.

FIGS. 4, 5 and 6 illustrate one example of a fiber 19 with the emitting surface textured. Serration 23 have been created on one side of the fiber, as by pressing it onto the surface of a file. Similar serration can be created by heat forming and moulding. Both plastic and glass optical fibers can be so formed. Heat forming can be accomplished by pressing the fiber slightly onto a heated metal surface which can be serrated, corrugated, or otherwise formed. The angle of the serration can vary. It is not necessary to first remove the cladding of the fiber as this will be displaced. After treatment, a sensor portion emits some light along the length while transmitting a portion of any light within it to either end.

Figure 7:
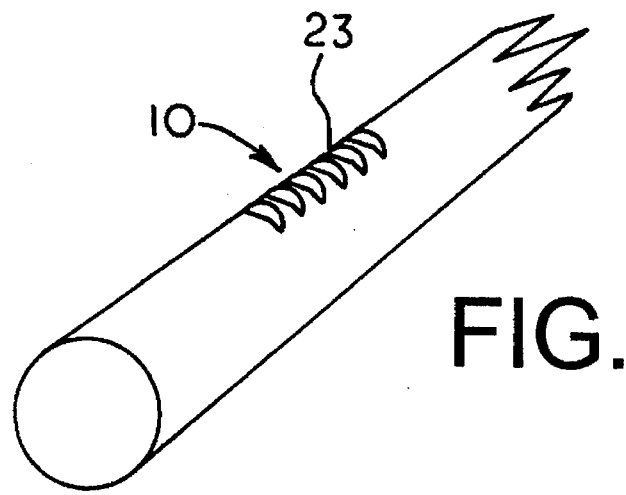
FIG. 7 illustrates an alternate form of surface treatment of the light guide.
Figure 8:
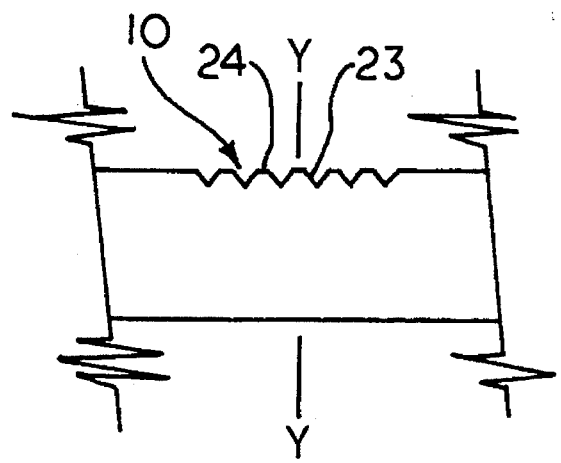
FIG. 8 is a side elevation of the light guide of FIG. 7.
Figure 9:
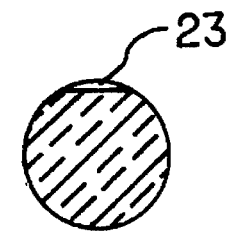
FIG. 9 is a transverse cross-section of the sensor as on line Y—Y of FIG. 8.

FIGS. 7, 8 and 9 illustrate another form of serration of a fiber 19. In this example the wedge-shaped serration 23 of the sensing portion 10 are separated by small spaces 24. The exact shape of the serration can vary considerably. Diamond-shaped serration have also been successfully used. These are formed by pressing the fiber against a file with a pattern of intersecting serrations.

Alternatively, one side of the fiber can be abraded by sanding, sand-blasting, etching, or other means of removing or changing the cladding layer.

Figure 10:
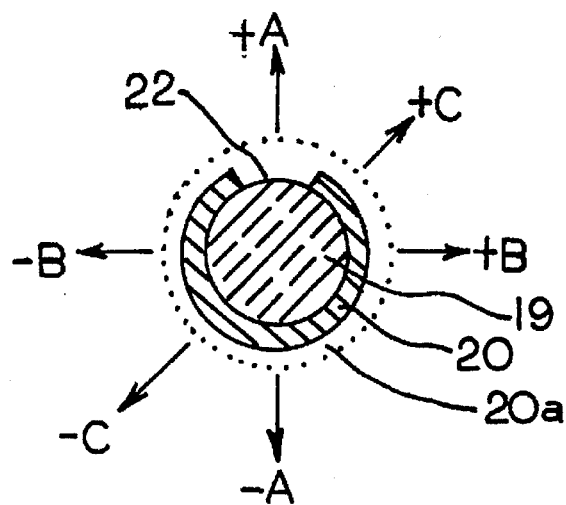
FIG. 10 is a transverse cross-section of a sensor showing the axes of maximum and minimum sensitivity to bends.

FIG. 10 illustrates the axes of maximum and minimum sensitivity, and the direction of signal change of a bending sensor. In this cross-section, the light emitting surface band is 22 at the top of the sensing section of the fiber. Bends within the vertical plane containing A-A produce the maximum change in transmission of light through the fiber. Thus A—A is called the axis of maximum sensitivity. For bends concave upward, the transmission increases. For bends concave downward, the transmission decreases. The minimum change in transmission occurs for bends in the horizontal plane containing B—B. Bends in this plane produce negligible change in transmitted light, so B—B is called the axis of minimum sensitivity. Intermediate response occurs for bends off the major axes, such as at C—C. This intermediate response is a cosine function of the angle between the plane of maximum sensitivity and the plane of the angle of the bend. In the figure, + and − signs have been placed to indicate increases and decreases in transmitted light relative to the transmission of the fiber when it is straight. The surface band 22 can be just bare fiber, as in FIG. 2, or textured, as, for example, in FIGS. 4 to 9.

Figure 11:
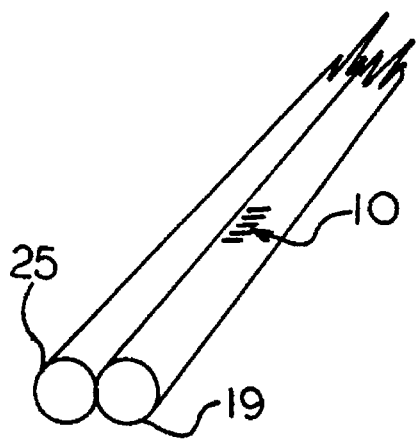
FIG. 11 is a perspective view of a sensor employing a non emitting reference fiber paired with an emitting, sensing, fiber.

FIG. 11 illustrates a sensor including a paired reference fiber. Fiber 19 has a sensing portion 10. Fiber 25 has no sensing portion. The pair are used in dual detection methods, where all measurements are referenced to the transmission through fiber 25. Because fiber 25 is arranged mechanically in the same way as fiber 19, most errors are eliminated from the measurement, by virtue of the fact that untreated fibers show little change in transmission for small bend angles (roughly less than 20°, whereas formed fibers are optimized for response to bending).

Figure 12:
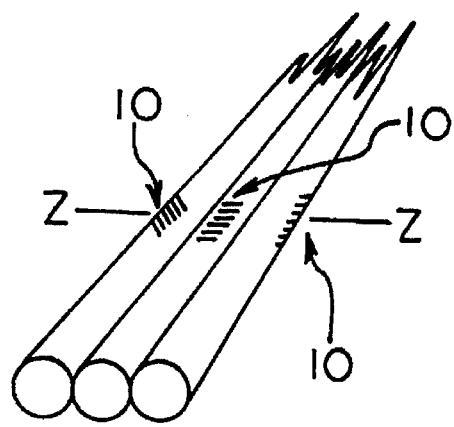
FIG. 12 is a perspective view of a triple sensor for detecting the three-dimensional bend vector.
Figure 13:
FIG. 13 is a cross-sectional view of the triple sensor on the line Z—Z of FIG. 12, showing the 120° arrangement of emitting sections.

FIG. 12 illustrates three fibers, arranged to form a sensing system capable of detecting the three-dimensional vector describing the applied bend. Each fiber has a light emission portion 10, just bare fiber or formed with serration or abrasions. The sensing portions are arranged so that the axes of maximum sensitivity are at 120° to each other. FIG. 13 shows this relationship more clearly. Solving simultaneous equations for the magnitude and sign of the transmissions of the fibers will yield the three components of the bend vector of an element, such as a beam, to which the sensor has been affixed. Alternate arrangements of the fibers are possible, such as having the sensing portions facing at different angles, triangular rather than flat bundles, or having the fibers separated from one another. In the examples illustrated in FIGS. 11, 12 and 13, the fibers are conventional in that they are composed of the main fiber, of glass, plastic or other, with a cladding layer. The cladding layer is locally removed at the sensor positions 10 as mentioned above, by various means.

Figure 14:
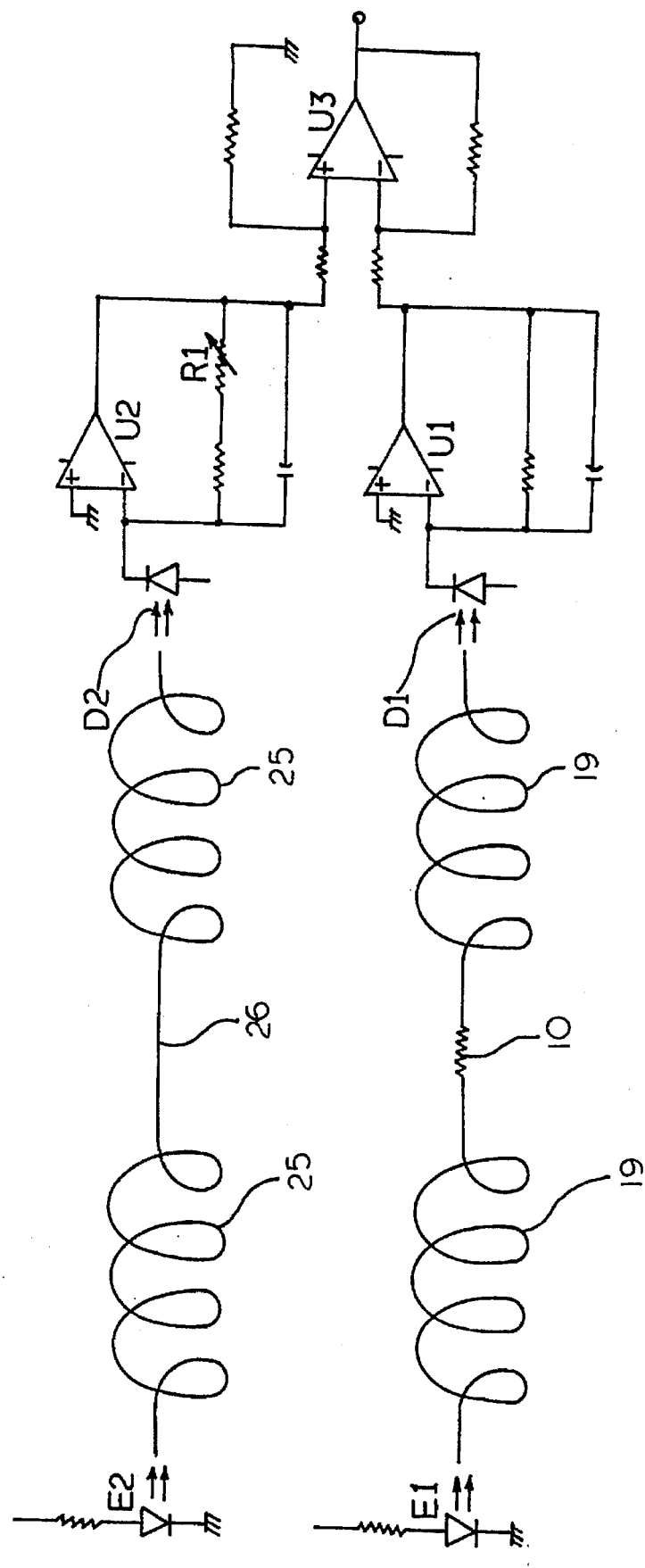
FIG. 14 is a schematic diagram showing light paths and electronic circuitry.

FIG. 14 illustrates one simple example of electronic circuitry that can be used to measure the transmission of light through a paired sensor element such as that shown in FIG. 11. In FIG. 14, fiber 19 (shown coiled to indicate arbitrary placement and length of the guide conveying light to and from the sensing portion) has the light emitting strip at 10. Fiber 25, which is otherwise the same as fiber 19, has no sensing portion at position 26, which represents a section of the fiber in close proximity to sensor section 10. Both fibers are illuminated by photoemitters E1 and E2, which are light emitting diodes. Photodetectors D1 and D2, which receive light from the fibers, are PIN photodiodes, back-biased with 12 Volts to enhance the speed of their response to light energy. U1 and U2 are high input impedance operational amplifiers arranged as transimpedance amplifiers, converting light energy linearly into voltages fed to the inputs of U3, which is an operational amplifier connected as a differential amplifier with a gain of 10. The gain of amplifier U2 can be varied with R1 so that for a straight fiber, the inputs to U3 are equal. In this condition, the optoelectronic circuit is analogous to a two-armed bridge such as is used to make strain-gauge measurements. Errors due to degradations in the fibers, connector variations, temperature fluctuations, and the like tend to cancel before reaching the output of U3. The output of U3 is a voltage which aries with bending at the band portion 10. The output voltage can be further amplified and sent to a display unit or used to control various parameters, such as actuators designed to minimize the angle of bend.

Many variations of the circuitry are possible, including variations with much greater immunity to error sources. One such variation would use the same light source and detector, separating the signals by chopping them at different frequencies and employing synchronous detection. Another variation is to replace U3 in FIG. 14 with a divider circuit, so that the sensor signal is divided arithmetically by the reference signal.

Another variation uses one photoemitter, for example E1 in FIG. 14, to illuminate the sensor fiber, such as 19 in FIG. 14, and also to illuminate a reference fiber such as 25 in FIG. 14. This last variation may be further enhanced by eliminating U3, using U2 and another amplifier to control the light out of 25 to constant value, and reading relative light transmission through 19 directly from the output 12.

Figure 15:
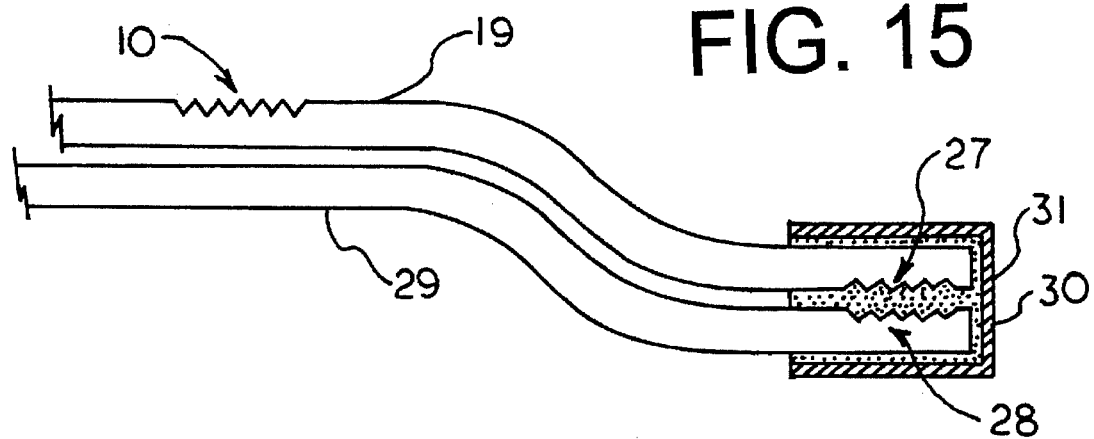
FIG. 15 shows an alternative form of the light guide return path.

FIG. 15 illustrates a variation of the sensor design which eliminates loops of light guide past the sensing portion. Light from a photo-emitter enters the system throughguide 19 and passes through the sensing portion 10. Another sensing portion 27 faces sensing portion 28 on guide 29. An opaque cap 30 filled with optically clear adhesive 31, covers this junction area. Guide 29 carries light back to a photodetector. The junction region at 27 and 28 is held rigidly by the cap and adhesive so that it does not respond to bending. This arrangement allows the use of parallel fibers without return loops, which can be an advantage when embedding the sensors in long, narrow structures.

Alternatively, the fibers 27 and 28 can be non-serrated, and inserted part way into the opaque cap 30, in this variation, the cap is preferably filled with translucent white polymer such as epoxy mixed with white pigment. Diffusion of light through the polymer accounts for transmission of light from fiber 27 to fiber 28.

Alternatively, a mirror can be used to reflect light from the distal end of the sensor fiber back into a return fiber. In another alternative, a directional coupler can be used with a single sensor fiber which has a mirror mounted at its distal end. The coupler is used to pass light to the proximal end of the fiber from the emitter, and to direct reflected light emanating from the proximal end of the fiber, into the detector. Typically, the directional coupler would be placed between the emitter, the detector, and the proximal end of the fiber.

Figure 16:
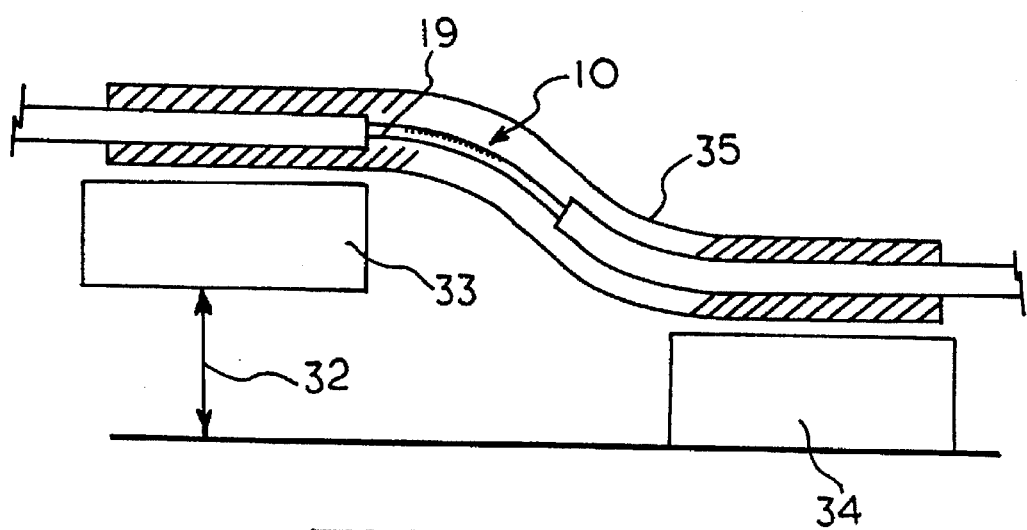
FIG. 16 shows an alternate application of the sensor, to measurement of position.

FIG. 16 illustrates the application of the bending sensor to the measurement of displacement. Vertical displacement 32 between blocks 33 and 34 (representing, for example, moving parts of a mechanical system), is measured by a bend-sensing region 10 in guide 19, cemented into flexible beam 35, which is attached to the two blocks. Similar fixturing, with or without a flexible beam, would enable the measurement of angles, such as pedal position, over a large range.

The advantages of the sensing devices described above are illustrated in FIGS. 17, 18 and 19. For these figures the sensors were fabricated from methyl methacrylate optical fiber, 1 mm in diameter. The black plastic jacket was left on the fiber except for a 50 mm section near the sensing portion, where the black plastic was removed.

Figure 17:
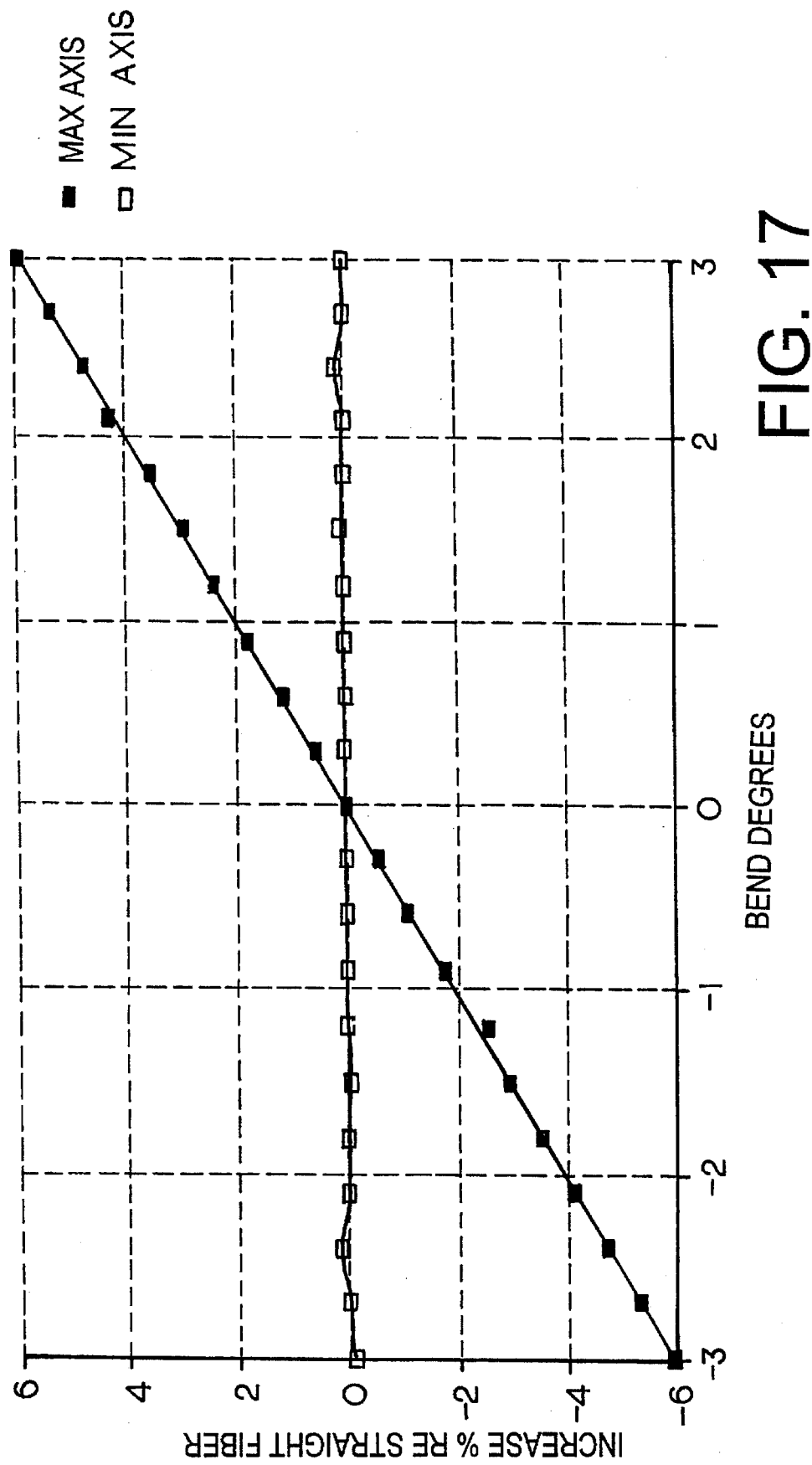
FIG. 17, 18 and 19 are graphs of the percentage changes in transmission of light guides treated in various ways to sense bending.

FIG. 17 illustrates, by way of example, the percentage change in transmission, that is the amount of light transmitted compared to 100 percent for a straight fiber, of a 1 mm diameter plastic fiber formed over a 25 mm length with serration and affixed with epoxy adhesive to a plastic beam. Weights were placed on the beam, which was clamped at one end, to produce the angular deflections shown on the horizontal axis of the graph. Two outputs of the sensor are shown. One is from the sensor when the beam is mounted to bend along the axis of maximum sensitivity (serration pointing up); the other is the output when the beam is mounted to bend along the axis of minimum sensitivity (serration pointing horizontally). There is virtually no sensitivity to bending along the axis of minimum sensitivity. The sensor response in the axis of maximum sensitivity is essentially linear with respect to angular deflection, increasing for upward bends and decreasing for downward bends.

The graph illustrates the sensitivity obtainable with very simple electronics (for example, as shown in FIG. 14). One could measure beam deflection with a strain gauge on the top of the beam. The strain gauge would be responding to elongation of the top surface of the beam rather than curvature of the top surface. The beam is undergoing an elongation of approximately 120 microstrain (microns per meter) along its top for a 3° deflection, indicating that the optical sensor is achieving a resolution of better than 12 microstrain (120 microstrain over 10 data points) for this experiment. Other sensors have been constructed which are capable of resolving less than 1 microstrain, which is the approximate lower sensitivity limit for strain gauges. Because it is possible to measure curvature with a bending sensor on the neutral axis of the beam, where there is, by definition, no strain, the lower limit for strain sensitivity is zero.

Figure 18:
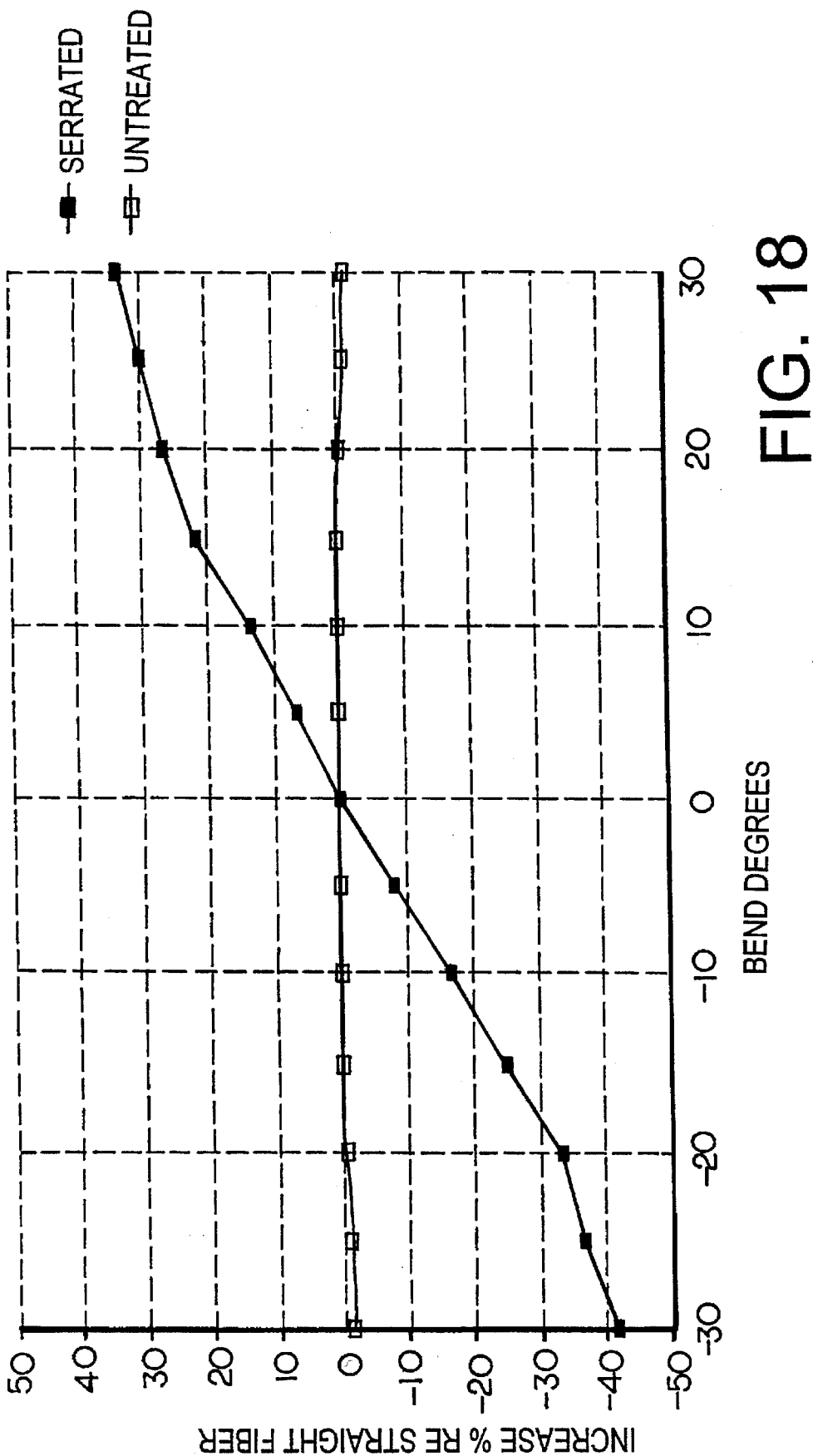

FIG. 18 illustrates, by way of example, the response of a fiber light guide having serration over a 25 mm length compared to the response of an unformed fiber. The fibers were clamped near one end of the sensitive region and moved so as to bend in a loose curve of the total angle shown on the horizontal axis of the graph. The fiber with the sensing portion was moved in the plane of maximum sensitivity. The fiber demonstrates a large range of linear response; approximately ±20°. When moved similarly, the unformed fiber, an example of a microbend sensor, showed virtually no change with angle, except for angles over 20 degrees, where the response is approximately 20 times less than the formed fiber.

Figure 19:
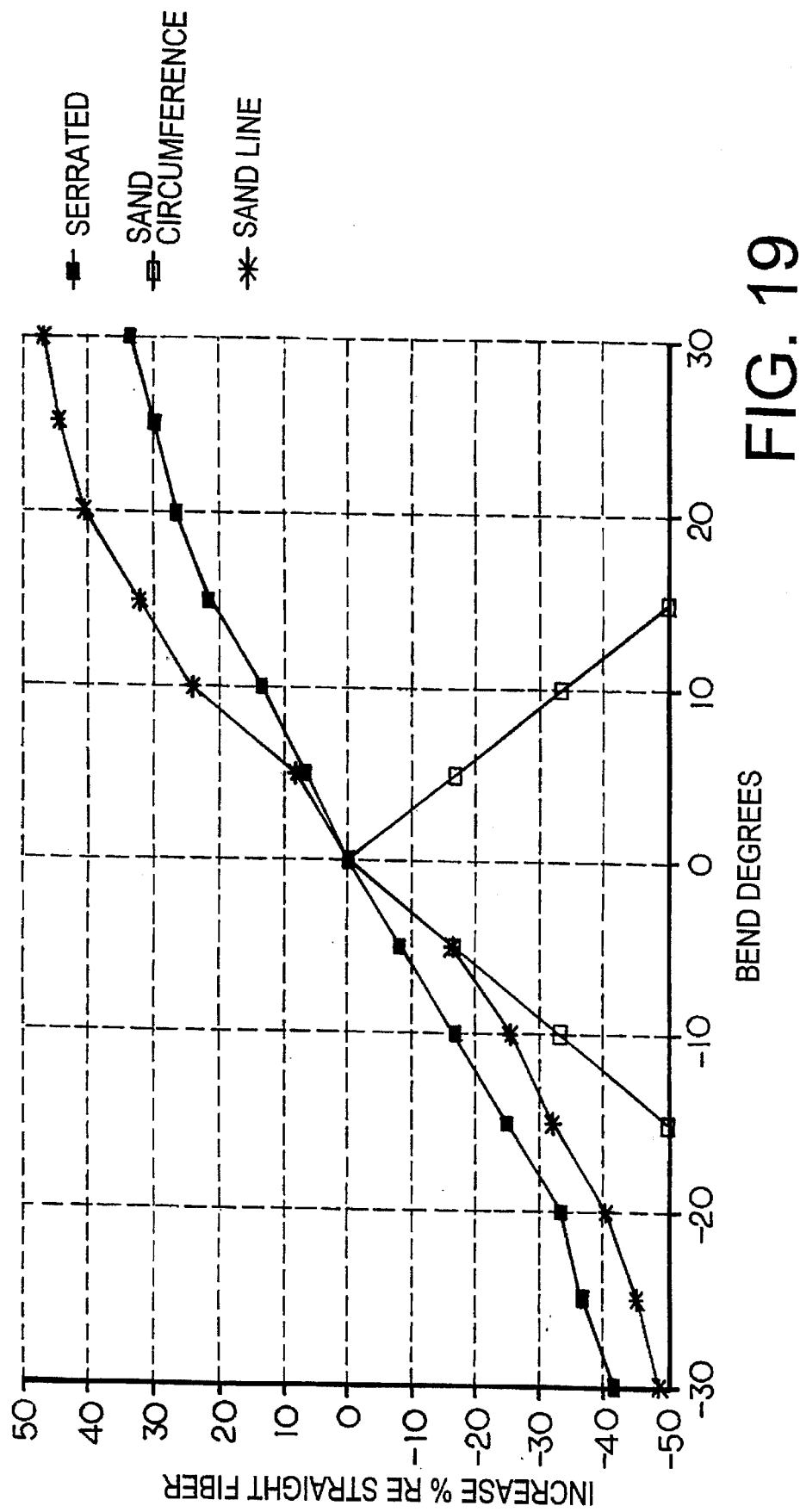

FIG. 19 illustrates, by way of example, the response of three fibers having the textured surface formed in different ways. The test setup is the same as for FIG. 17. The first fiber has serration over a 25 mm length. The second is formed by abrading slightly with fine sandpaper around the circumference of the fiber over a 25 mm length. The third is formed by abrading slightly with the same sandpaper over a 25 mm length, but only on one side of the fiber, similar in overall shape to the region of serration of the first fiber. The two fibers having the textured surface on one side show good preservation of direction of the bend in their responses. The fiber having the textured surface on its entire surface shows no preservation of the direction of bend. It would have to be bent when mounted on a structure. The serrated fiber shows linearity of response over a wider range than the fiber sanded on one side.

Figure 20:
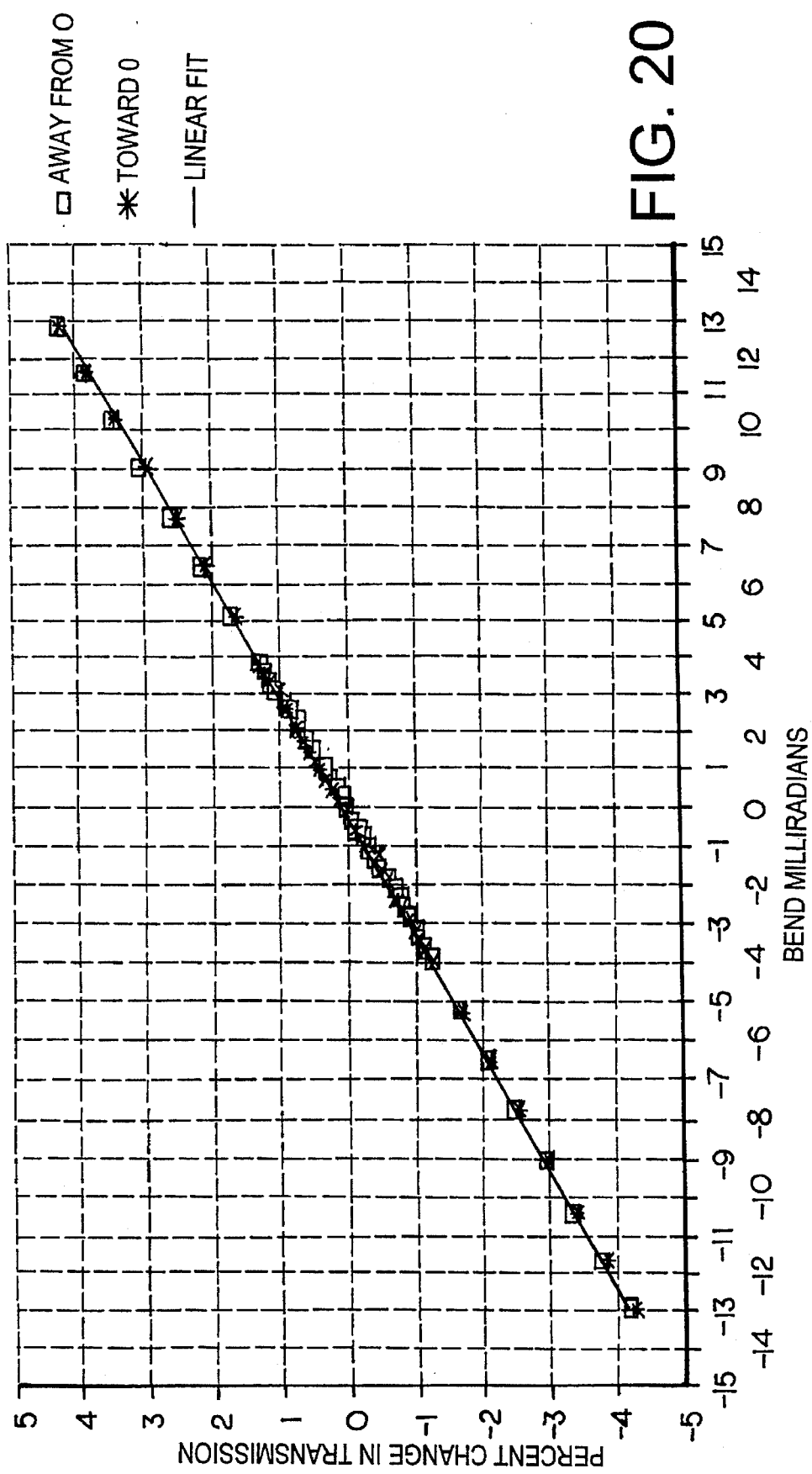
FIGS. 20 and 21 are graphs of the percentage changes in transmission for an opposed sensor pair made from two light guides.

FIG. 20 illustrates, by way of example, the response of a sensor pair mounted with epoxy adhesive inside a small piece of plastic tubing. Each sensor was formed by removing cladding along a strip on the side of a silica fiber core, 200 microns in diameter. The strip was 10 mm long. The two strips were coated with graphite-filled epoxy and arranged to face in opposite directions, so that response to bends was of opposite polarity but approximately equal magnitude for each sensor. The "percentage change in transmission" shown in FIG. 20 refers to the difference in the two electrical signals resulting from light transmission changes in the two sensors, as a percentage of the electrical signal from one sensor at rest. This paired method of measurement is one means of greatly decreasing the effects of common-mode emitter and detector drift. In this example, the tubing was first bent, by means of a micrometer drive, upward in the plane of maximum sensitivity (positive horizontal graph axis), away from its rest position (zero on horizontal axis). Next it was moved back toward its rest position. These steps were repeated for downward bends. The data points in FIG. 20 illustrate the excellent linearity of the system, and the low hysteresis ("away from zero" and "toward zero" points are nearly coincident). A straight line ("Linear Fit") has been drawn on FIG. 20 to illustrate the excellent linearity of response.

Figure 21:
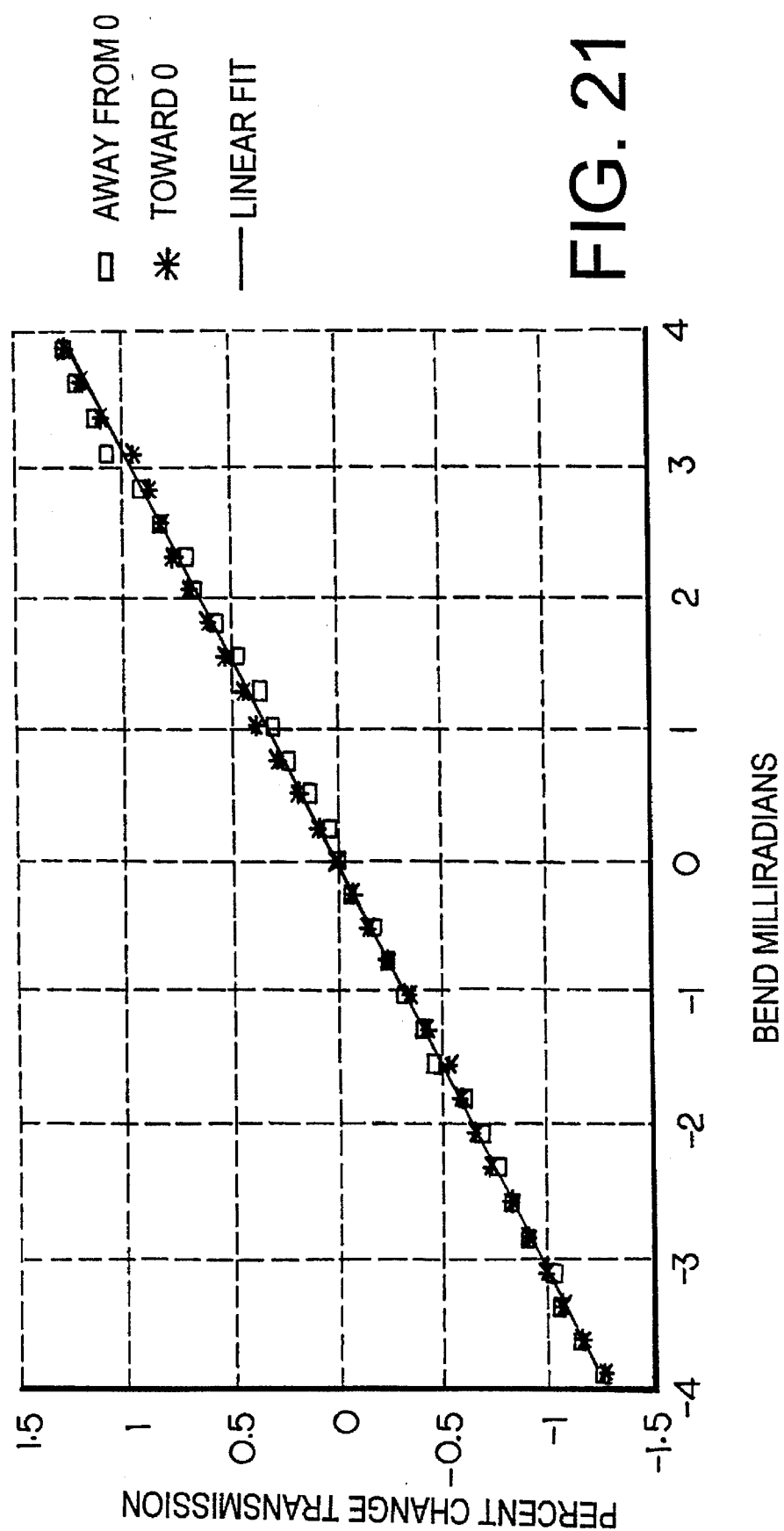

FIG. 21 shows the same data points as FIG. 20, over a small range of bends near the origin.

FIGS. 22 to 42 illustrate further embodiments in accordance with the present invention.

Figure 22A:
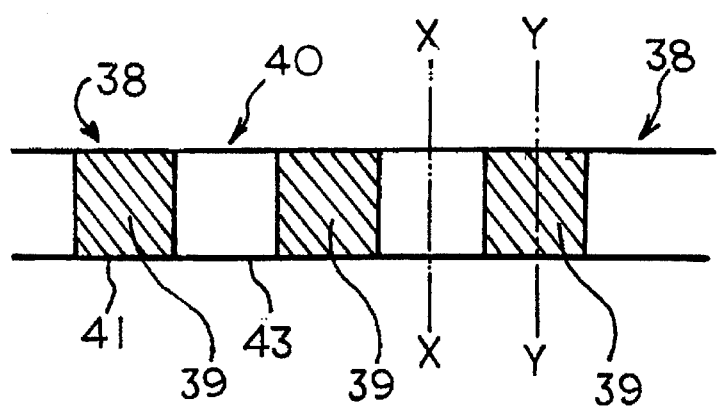
FIG. 22A is a side view of a fiber with alternating bands of treated and untreated material.
Figure 22B:
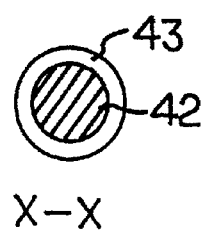
FIG. 22B is a cross section through one of the untreated portions of the fiber in FIG. 22A.
Figure 22C:
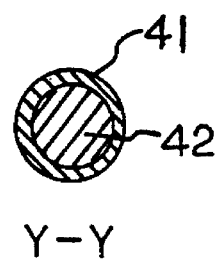
FIG. 22C is a cross section through a treated portion of the fiber in FIG. 22A.

FIG. 22A illustrates a fiber 38 with alternating circumferential bands of treated material 39 and untreated material 40. The figure shows the layers of the fiber out to the level of the cladding 43. The bands are formed by modifying the core and or cladding so that light is lost from the core. The bands can be formed by deliberately removing cladding as by abrasion, melting, etc. or by displacement as by pressure or rubbing on the fiber, for example by a heated tool, depending on the particular form of fiber. The treated bands are covered over with light absorbing material 41 which provides mechanical strength and environmental protection where cladding has been modified, but whose primary purpose is to absorb all light exiting the fiber from the core 42, which is shown in FIGS. 22B and 22C. Without this layer, the fiber can still act as a light guide because air surrounding it will have an index of refraction lower than that of the core. The fiber may actually transmit more light if the cladding is removed and no light absorbing coating is applied, thus preventing it from properly measuring curvature. In any case, without an absorbing coating the fiber will exhibit a nonlinear response that varies over time, especially if reflective materials, liquids, and dirt are present. With absorbing coating the response of the fiber is very constant over time and is unaffected by environmental factors. The absorbing coating may consist of carbon-filled epoxy, dyed elastomer, carbon-filled hot glue, or any other substance that permits light to exit the fiber but prevents it from re-entering in any substantial quantity. The light absorbing coating may serve other functions as well, such as protection of the fiber against environmental contamination. It may be applied only to the sensor portion of the fiber or may be incorporated into a part, such as a rubber or graphite/epoxy part, into which the sensor is embedded.

FIG. 22B is a cross section of fiber 28 through X—X where no treatment has been performed. Cladding layer 43 covers core material 42. Little light can escape from this section because the index of refraction of the cladding is less than that of the core. Excess absorbing material (not shown in this figure) may for convenience or for structural reasons cover the cladding in any of the untreated portions of the fiber.

FIG. 22C illustrates a cross section of the fiber 38 through Y—Y, a treated portion. Where the cladding has been removed or modified, it is replaced by absorbent material 41, which covers the core 42 and any remaining cladding (not shown in this figure).

Figure 23A:
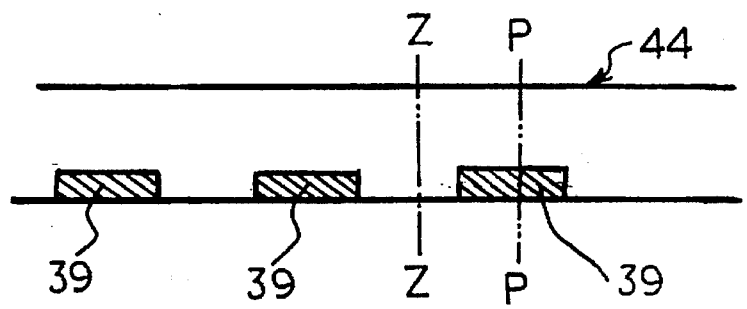
FIG. 23A is a side view of another type of treatment, showing alternating bands of treated and untreated material, the treatment not encompassing the entire circumference of the fiber.

FIG. 23A illustrates a fiber 44 with cladding 43, that has been treated as in FIG. 2A except that the treated bands 39 cover a partial extent of the circumference.

Figure 23B:
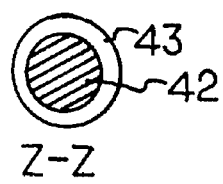
FIG. 23B is a cross section through one of the untreated portions of the fiber in FIG. 23A.

FIG. 23B shows a cross section through Z—Z, an untreated portion of fiber 44. This untreated portion is identical to that in FIG. 2B and includes a core 42 and a cladding 43.

Figure 23C:
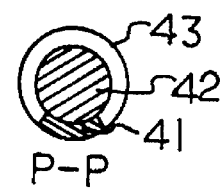
FIG. 23C is a cross section through one of the treated portions of the fiber in FIG. 23A.

FIG. 23C shows a cross section through P—P, a treated portion of fiber 44. The cladding has been modified or removed over part of the circumference and back filled with light absorbing material 41.

Figure 23D:
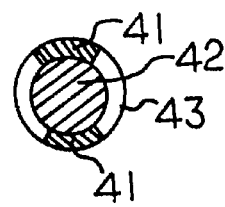
FIG. 23D is a cross section through a fiber as in FIG. 23A, but treated in an alternate manner.

FIG. 23D is a cross section through a fiber treated like the fiber in FIG. 23A but with both upper and lower surfaces treated to emit and absorb light. Although it is treated on both sides, it too will be maximally responsive to bends in the plane of maximum sensitivity passing through the centres of the two treated arcs. Its response to bends outside this plane will be a cosine function of the angle between the plane of maximum sensitivity and the other plane.

This cosine law is what allows the use of multiple sensor fibers with different angles of planes of maximum sensitivity to that three dimensional bands can be resolved by a set of sensors. It applies to any of these sensors except ones that include bands or rings which extend the entire circumference. The best cosine effect happens if up to half the circumference is treated to form a band. Otherwise, there is a "DC offset" added to all the cosine responses up to the point that the signal does not change with different plane angles—this happens when the bands are completely circumferential in extent.

Figure 24A:
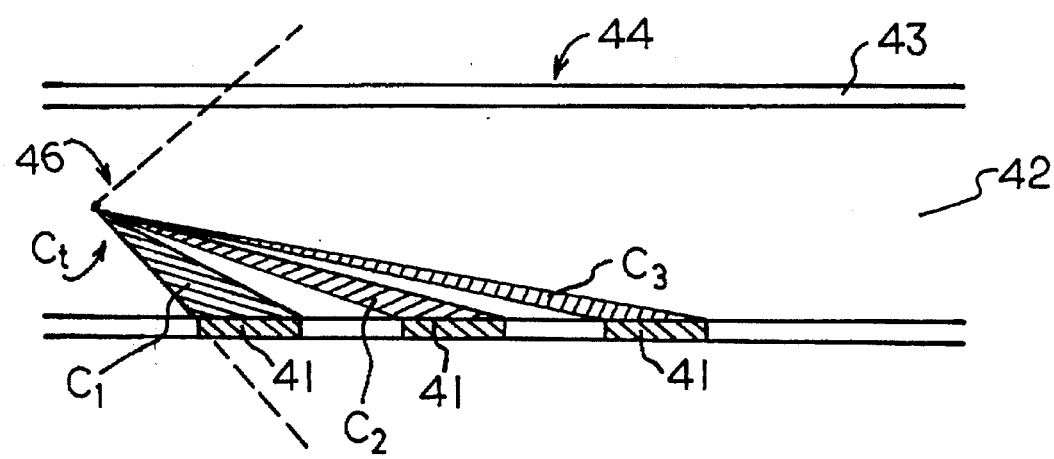
FIG. 24A is a longitudinal cross section of a straight section of fiber with three emission surfaces as in FIG. 23A, showing ranges of light rays subtended by emission surfaces.

FIG. 24A shows in longitudinal cross section a cone of light with an angle Ct that represents the solid angle of light that meets the internal refraction criteria for a fiber such as fiber 44 in FIG. 23A. This angle is called the acceptance angle of the fiber. The size of Ct is determined by the relationship between the indices of refraction of the core and cladding.

The acceptance angle can be related to the indices of the core and cladding through $$Ct = 2 \sin^{-1}((n_1^2 - n_2^2)^{1/2}),$$

where the argument of the inverse sin function is called the numerical aperture of the fiber, which is determined from the index $n_1$ and $n_2$ of the core and cladding respectively. Rays leaving representative point 46 with angles included in Ct will be refracted back into the core wherever they strike the cladding, and continue propagating down the fiber. Rays within angular ranges C1, C2, and C3 will strike the treated portions 41 and be lost.

Figure 24B:
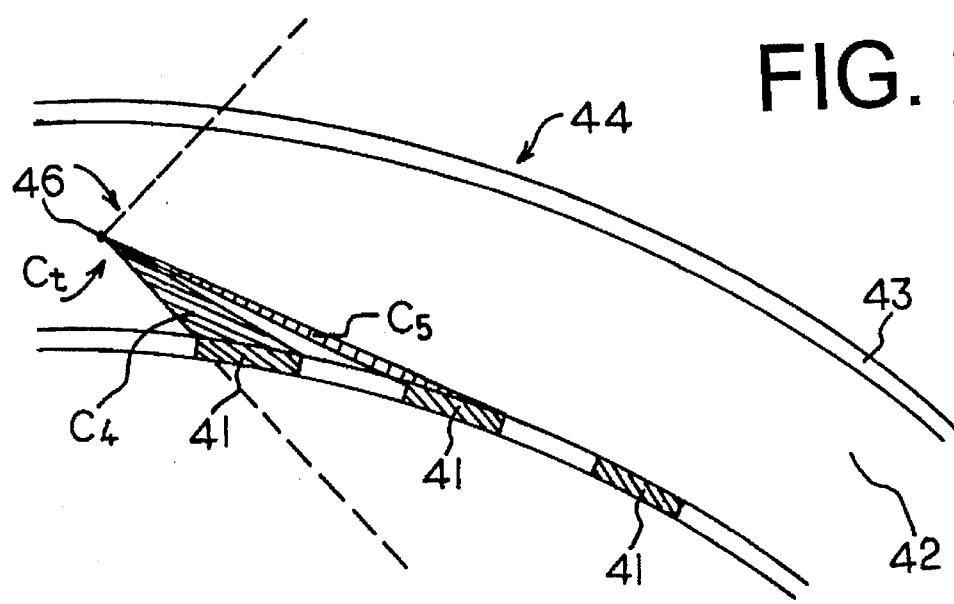
FIG. 24B is a longitudinal cross section of a downward curving fiber as in FIG. 24A.
Figure 24C:
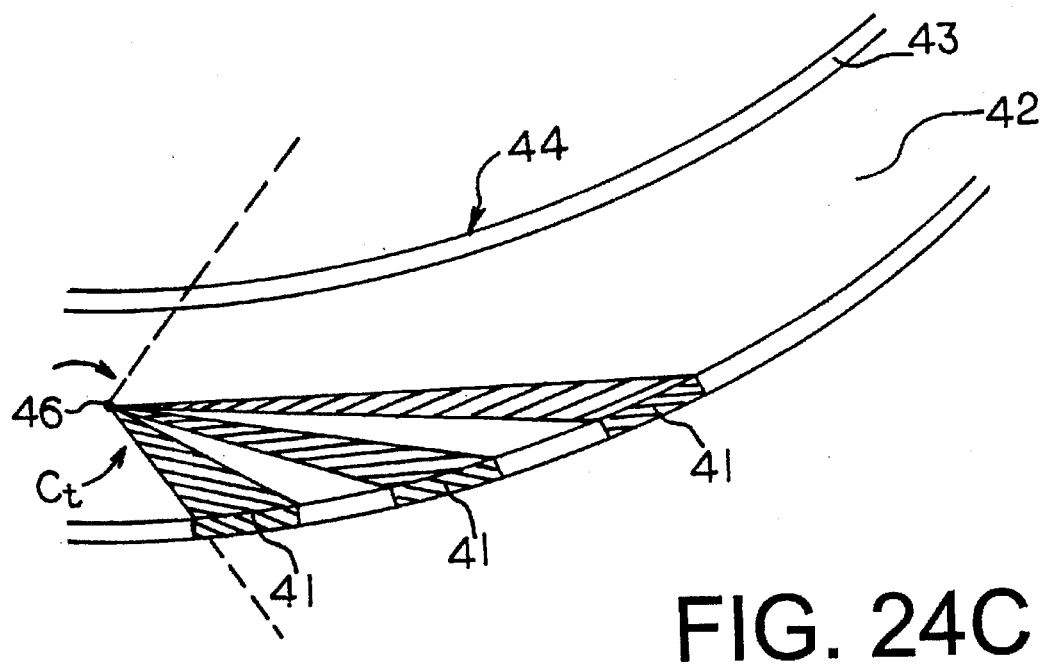
FIG. 24C is a longitudinal cross section of a upwardly curving fiber as in FIG. 24A.

FIG. 24B shows angular ranges C4 and C5 within total cone angle Ct for the fiber 44 in a bent state. Because of the bend, the treated portions subtend smaller angles of light, so that C4<C1, C5<C2, and there is no C6 corresponding to C3 in FIG. 23D. This is the mechanism which produces an increase in light level as the fiber is bent to make the treated portions become more concave. Conversely, as it is bent in the other direction, the angles subtended by the treated portions become larger and represent a larger portion of the total acceptance angle Ct. This causes a loss of light compared to a straight fiber.

It is possible to increase the range of curvatures over which the fiber will have a substantial change in throughput for bends making the treated portions more concave. This can be done by adjusting the axial lengths of the individual light emission surfaces and the length of the entire treated zone. FIG. 25 shows the results of tests of a fiber treated with successively more emission surfaces along an axial line of the surface of the fiber. Each surface was 3 mm long, and spaced from the others axially by 3 mm. Data are shown for 2, 4, 6, and 8 emission surfaces. The fiber was held over various round mandrels to produce the curvatures shown. Curvatures include positive (emission surfaces concave) and negative (emission surfaces convex) values. From the family of curves in FIG. 25 it is evident that when there are fewer surfaces, the positive curvatures tend to produce changes in light that are not linear with curvature, but the negative curvatures tend to produce linear changes. This effect is very evident in the 2×3 mm curve. As more surfaces are added, the linear portion of the curve moves toward the positive curvature region, as in the 8×3 mm curve. Intermediate values (as in the 6×3 mm curve) can be chosen to place the linear range approximately intermediate between positive and negative curvatures.

Figure 26:
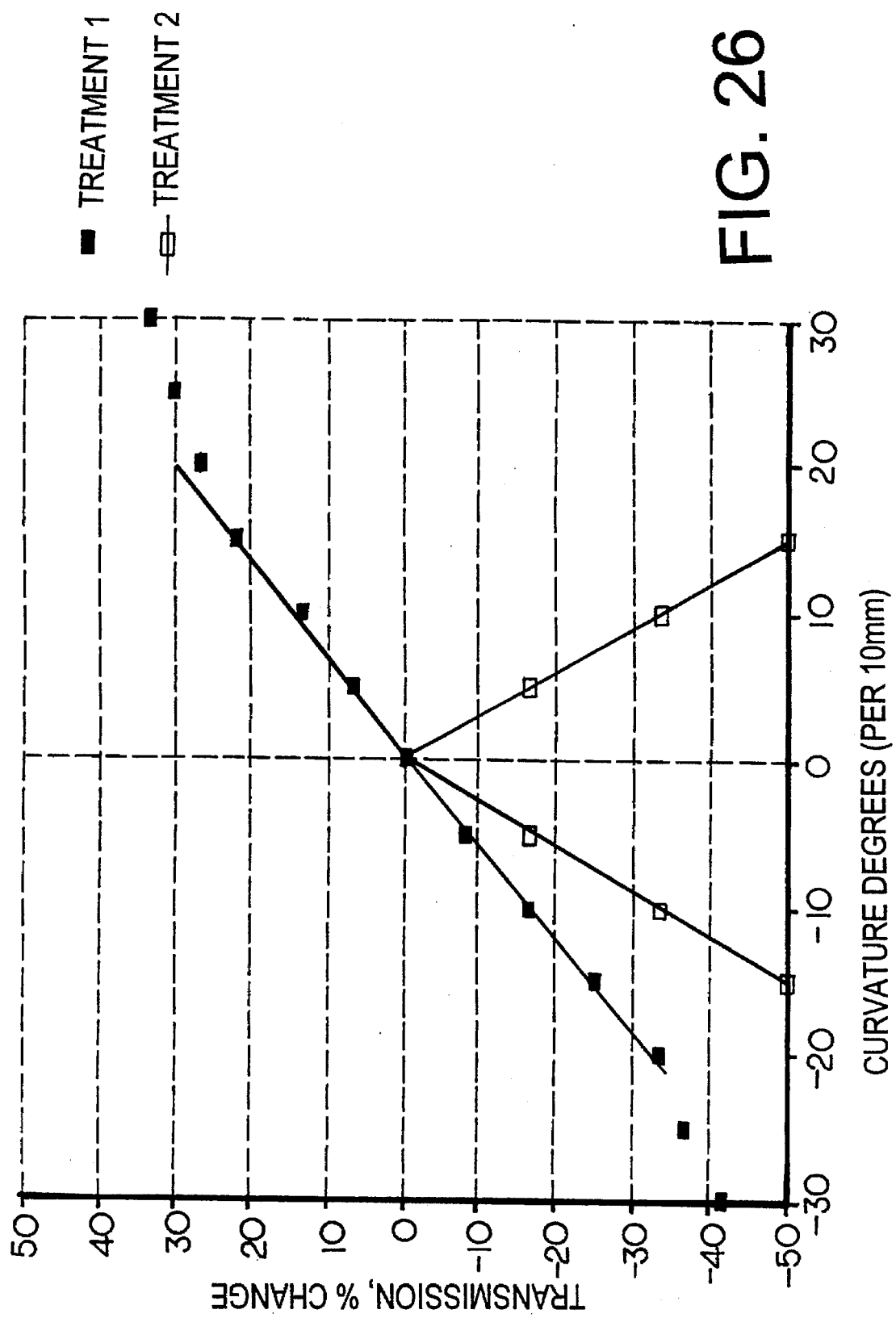
FIG. 26 shows a more detailed graph of a fiber sensor treated as in FIG. 25, to have a linear region centred on zero curvature as well as data from another type of sensor.

FIG. 26 shows a more detailed graph of a fiber sensor treated as in FIG. 25 to have a linear region centred on zero curvature, as well as data from another type of sensor. The "centred" data are shown in the curve for "Treatment 1." The data for "Treatment 2" are from a similar fiber that was treated over its entire circumference so that it has a negative sloped response for positive curvatures.

Together, FIGS. 25 and 26 show that by applying various methods of treatment, it is possible to place the linear ranges of the fiber response curves so that they reflect various ranges of curvature, and to change the slope of curvature over a wide range.

The various curves shown in FIG. 25 are explained in the following way:

For a fiber bent so as to make its emission surfaces more convex, (negative curvature in FIG. 25), the surfaces continue to intercept more rays the farther the fiber is bent. The fiber may be bent substantially in this direction with an ever increasing loss of light. However, the fiber will have a nonlinear response for very large negative curvatures (as seen in FIG. 25, 8×3 mm), because of the failure of the emission zones to intercept additional rays. As the fiber is bent the positive way, fewer rays are intercepted (see FIG. 24C) as the bands take on an increasingly concave form. However, for a short emission surface, the surface is soon substantially out of the path of the rays. There is then no further loss of light, because it is predominantly reflected from the side of the fiber away from the emission surfaces, and does not interact with them. The interaction is least when there are few emission surfaces, as evidenced in FIG. 25, 2×3 mm and 4× 3 mm. The 2-surface fiber (and a 1×3 mm surface fiber which is not shown) even shows an increased loss for the largest curvature tested, probably due to microbending losses predominating over emission surface losses.

In one embodiment, the present invention utilizes such a large linear region for positive curvatures to increase the net throughput of the sensor system. By spacing the emission surfaces, it is possible to both increase the sensitivity and size of the linear region for positive curvatures and to minimize the residual light loss because a substantial number of rays can still pass the sensor region without attenuation. The extended structure permits distant bands to intercept light rays that are nearly parallel to the fiber axis, even when the curvature change is minimal. This leads to a high sensitivity with minimum residual light loss. If one attempts to achieve high sensitivity for positive curvatures by lengthening a single emission surface, a limit is reached where the increase in residual light loss exceeds any gains in sensitivity, even though linearity is maintained.

For 1 mm plastic fibers, typical light emission surfaces for efficient sensors are approximately 2 to 10 millimetres in length, spaced by 2 to 10 millimetres. The overall length depends on the desired range but is typically up to 50 cm. Surfaces for smaller glass or plastic fibers are typically smaller. Notches may be used, but will not achieve the same sensitivity as uniform surfaces with smaller surface texture dimensions. This is probably because notches perform an emission function but also tend to scatter light back into the fiber. This is particularly true if they are not covered with a light absorbing layer. Notches have the further disadvantage of weakening the fiber.

If the emission surfaces occupy the total circumference of the fiber as in FIG. 22A, there is no increase in throughput for bends of the fiber in any plane. All of the sensing is done through decreases in light level. Nevertheless, spaced emission surfaces are still an advantage for many sensors, as they can be used to sense average curvature over a greater axial length of the fiber. This can eliminate or reduce undesirable effects from large local changes in curvature, for instance due to the presence of a foreign body under the fiber.

Ordinarily, a loop is used to return the light signal to the optoelectronic measuring system. Often, space is limited so that the loop must be formed in a tight curve such that substantial amount of light is lost from its outer convex surface. When combined with the residual light loss of a sensor elsewhere on the fiber, the resulting total light loss may be excessive. The "loop sensor embodiment" is designed to reduce this total loss by placing the emission surfaces in a novel manner.

In FIG. 27 is shown a sensor system designed to have maximum throughput even though it includes a loop 48 at the end that may be in a tight curve that loses light at its convex outer surface. This figure includes the same components as in FIG. 1 except that the treated section 10 is on the loop 48 instead of on a straight section of the fiber. The sensor is designed to measure curvature of the substrate to which the loop is attached. In FIG. 27, the sensor would be used to measure curvature at the end of the beam 11.

Figure 28C:
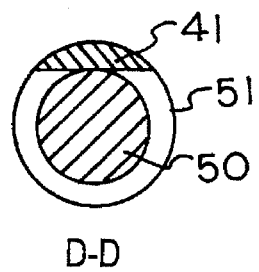
FIG. 28C is a cross section through one of the treated portions of the fiber in FIG. 28A.
Figure 28D:
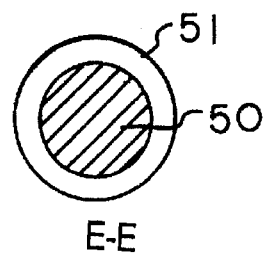
FIG. 28D is a cross section through one of the untreated portions of the fiber in FIG. 28A.
Figure 28E:
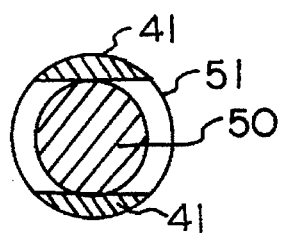
FIG. 28E is a cross section through a treated portion of another embodiment like the fiber shown in FIG. 28A except that both sides of the loop have been treated.
Figure 28F:
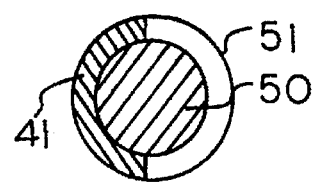
FIG. 28F is a cross section through a treated portion of another embodiment like the fiber shown in FIG. 28A except that the treated portion is located on the inner portion of the loop and is in a substantially circumferential orientation.
Figure 28G:
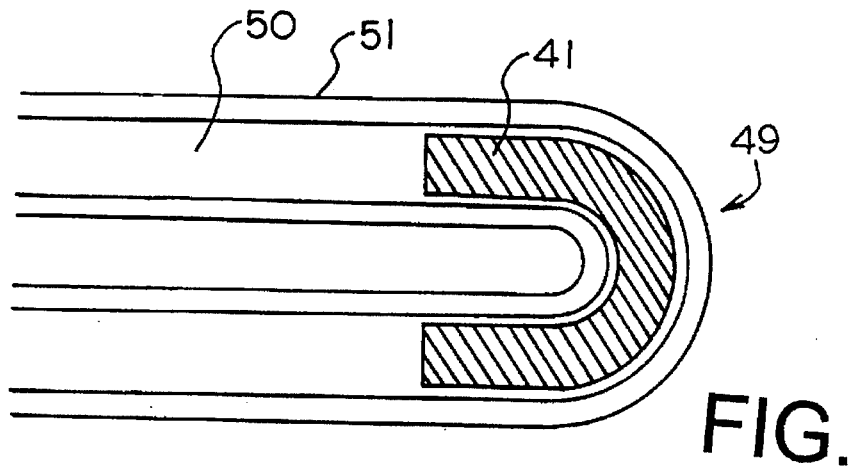
FIG. 28G is a plan view as in FIG. 28B, except that the emission surface is continuous.

A detailed drawing of one embodiment of the sensor of FIG. 27 is shown in FIGS. 28A through 28F. In FIG. 28A, the loop is shown in longitudinal section. Emission surfaces 49 have been formed in one surface of the fiber by removing cladding 51 from core 50 and replacing it with light absorbing material 41. In FIG. 28B, the emission surfaces 49 are shown in plan view. Cross sections in FIG. 28C and FIG. 28D show sections through treated (D-D) and untreated (E—E) portions of the fiber respectively. The number of emission surfaces is representative only. Larger loops could contain more emission surfaces. Emission surfaces may be formed on surfaces above or below the plane of the loop, or on an inside or concave portion of the curvature of the loop. FIG. 28E is a cross section illustrating emission surfaces on both the upper and lower surfaces of the loop. FIG. 28F is a cross section illustrating an emission surface on the inner concave portion of the loop. FIG. 28G shows another variation of loop sensor wherein the emission surface 49 covers virtually all of the upper surface of the loop.

Figure 29A:
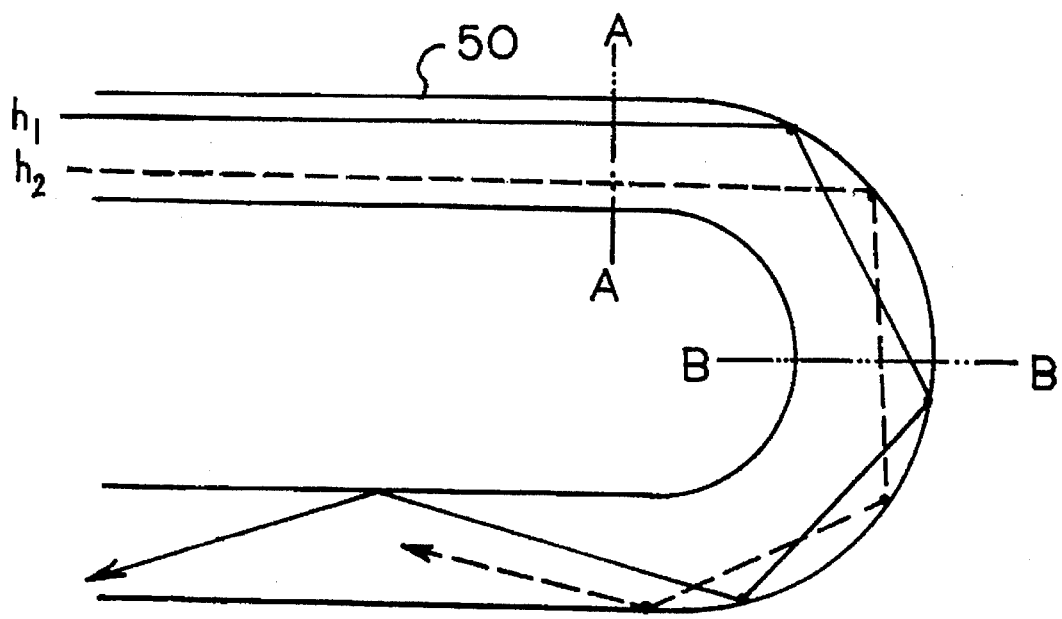
FIG. 29A shows a plan view of a turnaround loop as in the embodiments portrayed in FIGS. 28A through 28G. Two rays which originate as rays in the plane of the loop are shown travelling through the fiber, remaining in the said plane.
Figure 29B:
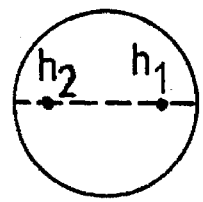
FIG. 29B shows a cross section through the fiber just before it begins to bend, showing the two rays still in the said plane.
Figure 29C:
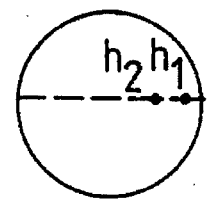
FIG. 29C shows a cross section through the fiber at the centre of the loop, showing the position of the two rays, which are still in the said plane.

FIG. 29A shows the core 30 of the loop of FIGS. 28A through 28D. Rays h1 and h2 are in the plane of the loop. They meet the outer convex surface of the loop and are refracted around the loop to continue on through the fiber. For rays substantially in this plane, there will be little change in direction out of the plane as they traverse the loop.

Figure 30A:
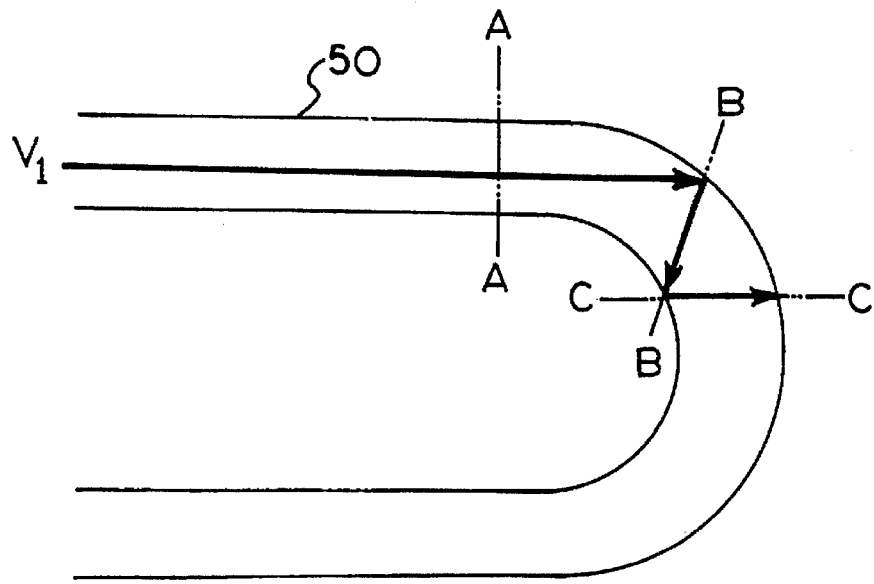
FIG. 30A shows the same loop as in FIG. 29A but with a ray that is parallel to the plane of the loop but displaced vertically.
Figure 30B:
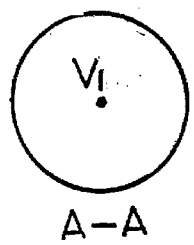
FIG. 30B shows a section through the fiber just before it begins to bend, showing the position of the ray above the plane of the loop.
Figure 30C:
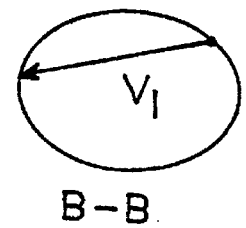
FIG. 30C shows a section through the fiber, containing the ray, showing deflection of the ray downward as it refracts from the outer wall of the loop.
Figure 30D:
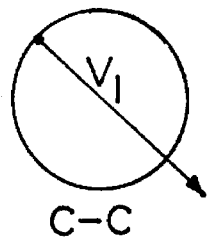
FIG. 30D shows another section of the fiber, containing the ray, showing deflection of the ray again downward, at such an angle that it is lost from the fiber at the outer wall of the loop.

FIG. 30B shows a ray v1 that is substantially out of the plane of the loop but parallel to it. The ray is shown in FIG. 30B, a vertical (perpendicular to the page) cross section through A—A, just before the ray enters the curve of the loop. The ray impinges on the outer convex surface of the loop. FIG. 30C shows a vertical section through the core containing the ray v1 after it refracts from this first collision. Because it is substantially above the plane of the loop, it is deflected downward by the curve of the fiber and collides a second time with the wall of the core. FIG. 30D shows a vertical cross section through C—C, a plane containing the ray v1 after its second collision. It is now travelling even more downward and impacts the outer curve of the loop at an angle such that it cannot be refracted back into the fiber, but travels through the cladding (not shown) and is lost.

Thus, rays that are travelling out of the plane of the loop but parallel to it will be deflected vertically as they travel through the loop. Rays above the plane will be deflected downward. Rays below the plane will be deflected upward. If they are sufficiently above or below the plane, they end up being lost because they strike the core/cladding boundary at too small an angle of incidence to the normal due to the quasi-spiral reflections indicated in FIGS. 30A through 30D.

We have seen above that there is a vertical impetus imparted to rays that travel through the loop without being lost at the outer convex surface of the loop. For convenience, these rays will be called "survivor" rays. They are distinct from "doomed" rays described FIGS. 30A through 30D that will either impinge directly on the emission surfaces early in their travel through the loop or be lost to the outer surface through excessive deflection. This change in elevation causes them to interact more or less with emission surfaces near the top or bottom of the loop. Thus, as the loop is curved out of its plane by an external stimulus, the emission surfaces interact with the survivor rays and cause the throughput to vary with curvature in much the same way as it does if the emission surface is located in a straight portion of the fiber. By adjusting the length, spacing, and circumferential extent of the emission surfaces, it is possible to change the throughput so that it is linear with curvature and to adjust the midpoint of the linear range so that it includes the zero curvature point.

With the sensor on the loop, the emission surfaces can be adjusted so that a large proportion of the survivor rays interact with the emission surfaces. Those survivor rays that do not get absorbed by the treated emission surfaces for certain curvatures are by definition the rays that get through the loop. This leads to a high sensitivity of survivor rays to curvature. Survivor rays are made up predominantly of rays that enter the loop in planes near the horizontal (in the paper) plane of the loop and that have small vertical components. By contrast, "doomed" rays arrive in predominantly vertical planes with larger vertical components. If instead of placing the emission surfaces on the curved loop, we placed them on the relatively straight fiber nearby, rays containing most of the sensor information would be in the vertical plane as they enter the loop and thus would be doomed rays. This would result in the light exiting the loop being made up mostly of rays that have not been modulated by the sensor. This is equivalent to reducing the sensitivity of the sensor. The same argument holds for a sensor downstream of the loop. The light leaving an untreated loop has been stripped of most of its vertical modes, so that a sensor placed in this light stream will be modulating a minority portion of the light passing through it. However, it is possible to form a useful loop sensor wherein the emission surfaces extend somewhat beyond the loop, as long as they are substantially on the loop.

Although the loop sensor embodiment has advantages of increased sensitivity and lower residual light loss for many arrangements of emission surfaces, this should not be taken to be its only advantage. Even in the absence of sensitivity and loss advantages, there are compelling reasons to form a sensor on the loop. These include sensing at the end of a structure, reduction of fiber length, ease of mounting, reduction of stresses on the fiber inherent in mounting a sensor portion and a loop portion separately with free fiber in between, ease of manufacture, preservation of orientation, and simplicity. In addition, loop sensors may be made to be relatively free from responses to bends within the plane of the loop.

The upper curve in FIG. 30E shows the output of a loop sensor made by forming two axially oriented emission surfaces on the surface of a 7 mm diameter fiber loop of 1 mm diameter plastic fiber. The lower curve shows the sensor output when the same patches are formed on a straight section of fiber 2 cm from a 7 mm diameter untreated loop. For this arrangement of emission surfaces, the output of the loop sensor is superior to the output of a sensor formed apart from the loop.

Figure 31A:
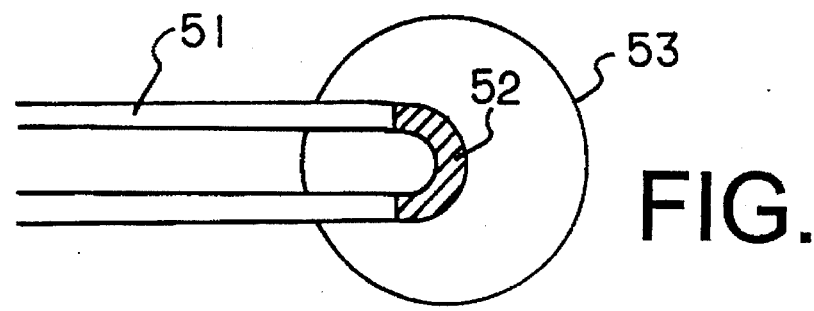
FIG. 31A is a plan view of a loop treated to sense curvature of a diaphragm, attached along the surface of a diaphragm.
Figure 31B:
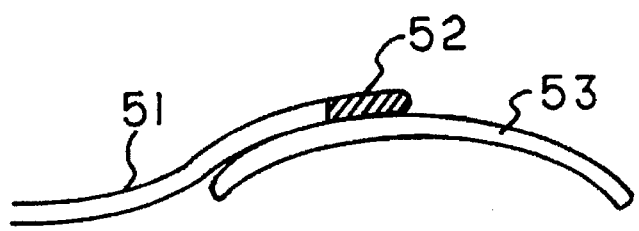
FIG. 31B is an elevation view of the sensor of FIG. 31A.

FIG. 31A shows another embodiment of the loop sensor, wherein a fiber 51, treated at the loop 52 to sense bending of the plane of the loop, is attached to a flexible diaphragm 53. These same parts are shown in FIG. 31B. As the curvature of the diaphragm 53 changes, the output of the sensor changes. This sensor structure could be used to measure pressure or to form a membrane-type keyboard, or to perform many other tasks wherein a diaphragm undergoes changes in curvature.

Figure 32A:
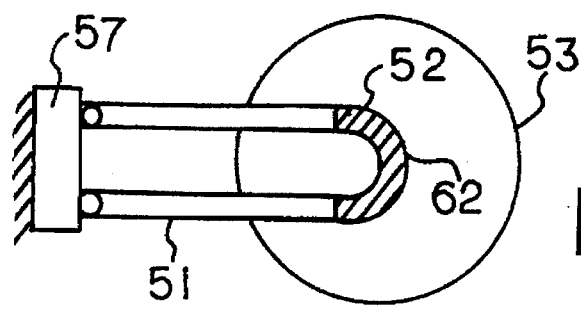
FIG. 32A is a plan view of a sensor as in 31A, except the loop is supported in a curve from above the diaphragm and touches the diaphragm at a point, so as to sense displacement of the diaphragm.
Figure 32B:
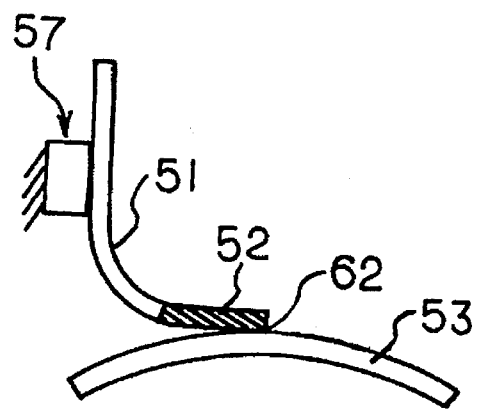
FIG. 32B is an elevation view of the sensor system of FIG. 32A.

FIGS. 32A and 32B show a sensor and diaphragm as in FIGS. 31A and 31B, wherein the fiber 51 is held in a fixed support block 57 so that at least the sensor portion of the fiber changes curvature according to the displacement of the diaphragm 53 at the point of attachment or contact 62.

Figure 33A:
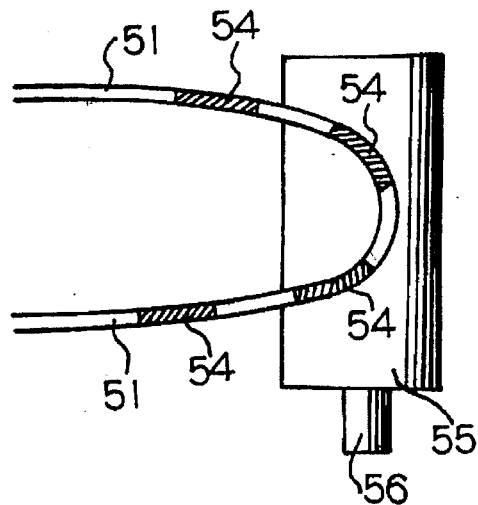
FIG. 33A is a plan view of a loop treated to sense curvature, attached at its apex to a rotating drum or shaft, for the purpose of indicating position of the shaft according to a varying curvature imposed on the loop.
Figure 33B:
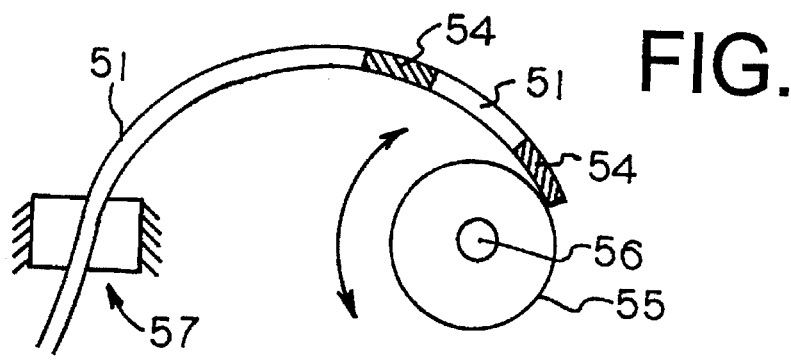
FIG. 33B is an elevation view of the sensor structure of FIG. 33A.

FIG. 33A shows a loop sensor wherein fiber 51 is treated at multiple portions 54 to be sensitive to bending of the plane of the loop. At the apex of the loop, it is attached to a turning shaft 55. FIG. 33B shows an elevation of the same sensor structure, wherein it can be seen that the turning shaft can be turned over a limited angular range clockwise or counter-clockwise about pivot 56 and that the loop is attached to an anchor point 57. As the loop winds around the shaft, its curvature increases, changing the throughput of light.

Figure 34:
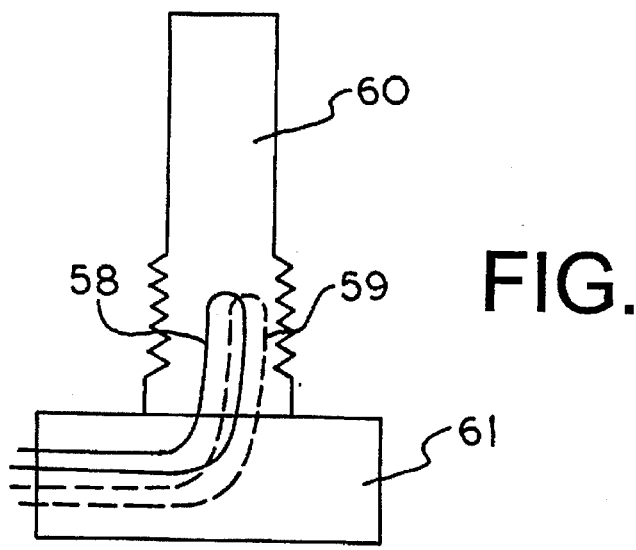
FIG. 34 is a transparent view of a joystick input device containing loops of fiber treated and arranged to sense displacement of the flexible joystick handle in two degrees of freedom.

FIG. 34 represents a joystick device wherein two loop sensors 58 and 59 are embedded in a vertical flexible shaft 60, attached to a base 61. The loops have planes of maximum sensitivity at right angles to each other, centred about the centre of the shaft. The outputs of the fiber sensors represent orthogonal components of the curvature of the shaft. In a miniaturized form, this sensor could be a keyboard-mounted input device for a computer.

Figure 35A:
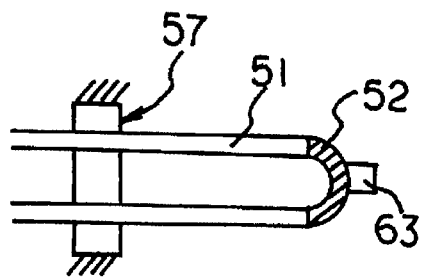
FIG. 35A is a plan view of a loop treated to sense curvature, mounted as a cantilever beam for sensing vibration and acceleration.
Figure 35B:
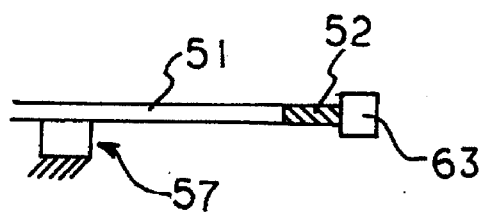
FIG. 35B is an elevation view of the sensor of FIG. 35A.

FIGS. 35A and 35B portray a loop sensor consisting of fiber 51 held by fixed support 57, with a sensor zone 52 on the loop. The structure to the right of the support 57 forms a cantilever beam. It is used to sense acceleration or vibration perpendicular to the plane of the loop. Optionally, a mass 63 may be attached near the end of the structure to modify the dynamic response of the sensor. The sensor could be used to perform a wide variety of acceleration measurements, including measurement of impact deceleration for the purpose of deploying an airbag protective system for automobiles. This structure is amenable to being manufactured by micromachining of a semiconductor or glassy substrate, wherein the fiber would be formed from the substrate and undercut by an etching process. A thin web or plate affixed to one side of the loop (not shown) could be added to prevent the shape of the loop from changing within its plane.

Figure 36:
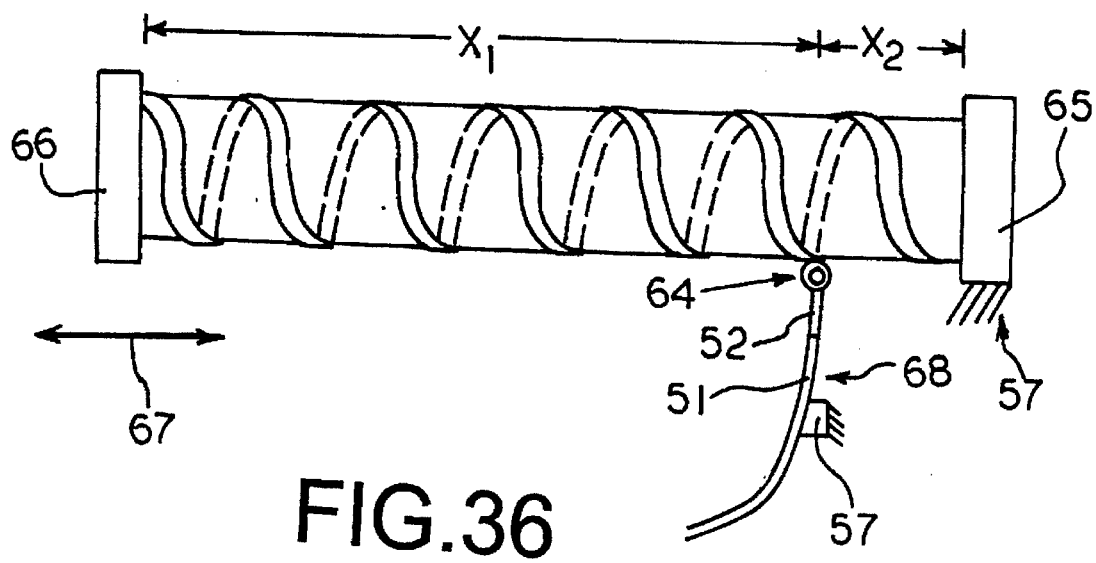
FIG. 36 is a side view of a spring and fiber loop system designed to translate large displacements of a body into relatively smaller displacements of the end of the loop.

FIG. 36 portrays a displacement sensor using a loop sensor 68 consisting of a fiber 51 with a treated portion 52 on a loop at its distal extent, attached to a spring at pivot point 64. The sensor is designed to sense a large displacement 67 of structure 66 relative to structure 65, which is fixed to a frame of reference to which the fiber is also fixed, both by means of holding structures 57. By selecting the attachment point of pivot point 64, the movement of the end of the sensor is restricted to a smaller range than movement range 67. The fractional amount of reduction is according to the ratio of distance X2 to the total of distances X1 and X2, yet the reduced movement is linearly related to the movement of structure 66. The pivot point may take the form of a hinge, ball joint, flexible beam, cable, wire, elastomer, or various sliding contact points, or alternatively, the loop sensor may be mounted inside the spring or through the turns of the spring in various ways such that its curvature is linearly related to the linear movement of the pivot point. This embodiment allows the use of a small curvature sensor with limited travel to measure large displacements.

It will be seen that the sensors described are particularly convenient for being embedded in structures. The loop sensors are particularly suited for measurements in thin tubes, pipes, rods and the like, particularly if measurements must be performed near the ends of the member. The loop sensors are well adapted for use in various probes that must be inserted into small spaces. Applications for the sensors in general are meant specifically to include at least all applications that could potentially be performed with strain gauges, plus others.

The sensor may be incorporated into a means of transport, means for construction, agricultural implement, robot, living body or a prosthetic device, for detecting a movement relation to a further movement or a point of reference.

Figure 37:
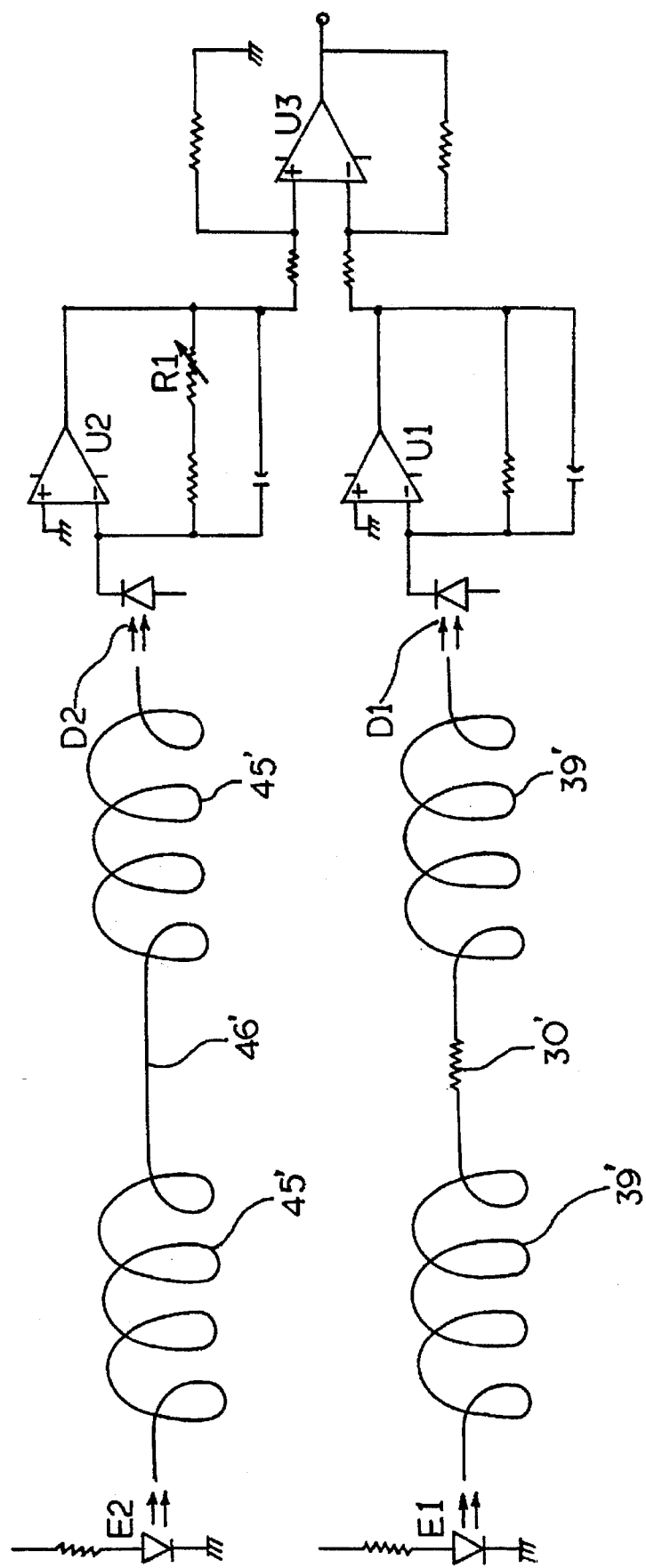
FIG. 37 is a schematic diagram showing light paths and electronic circuitry.

FIG. 37, which is similar to FIG. 14, illustrates one example of electronic circuitry that can be used to measure the transmission of light through a paired sensor element such as that shown in earlier Figures. In FIG. 37, fiber 39' (shown coiled to indicate arbitrary placement and length of the guide conveying light to and from the sensing portion) has the light emitting strip at 30'. Fiber 45', which is otherwise the same as fiber 39', has no sensing portion at position 46', which represents a section of the fiber in close proximity to sensor section 30'. Both fibers are illuminated by photoemitters E1 and E2, which are light emitting diodes. Photodetectors D1 and D2, which receive light from the fibers, are PIN photodiodes, backbiased with −12 Volts to enhance the speed of their response to light energy. U1 and U2 are high input impedance operational amplifiers arranged as transimpedance amplifiers, converting light energy linearly into voltages fed to the inputs of U3, which is an operational amplifier connected as a differential amplifier with a gain 10. The gain of amplifier U2 can be varied with R1 so that for a straight fiber, the inputs to U3 are equal. In this condition, the optoelectronic circuit is analogous to a two-armed bridge such as is used to make strain-gauge measurements. Errors due to degradations in the fibers, connector variations, temperature fluctuations, and the like tend to cancel before reaching the output of U3. The output of U3 is a voltage which varies with bending at the band portion 30'. The output voltage can be further amplified and sent to a display unit or used to control various parameters, such as actuators designed to minimize the angle of bend.

Many variations of the circuitry are possible, including variations with greater immunity to error sources. One such variation would use the same light source and detector, separating the signals by chopping them at different frequencies and employing synchronous detection. Another variation is to replace U3 in the above Figures with a divider circuit, so that the sensor signal is divided arithmetically by the reference signal.

Another variation uses one photoemitter, for example E1 in FIG. 14, to illuminate the sensor fiber, such as 19 in FIG.

14, and also to illuminate a reference fiber such as 25 in FIG. 14. This last variation may be further enhanced by eliminated U3, using U2 and another amplifier to control the light out of 25 to a constant value, and reading relative light transmission through 19 directly from the output of U2.

Figure 38A:
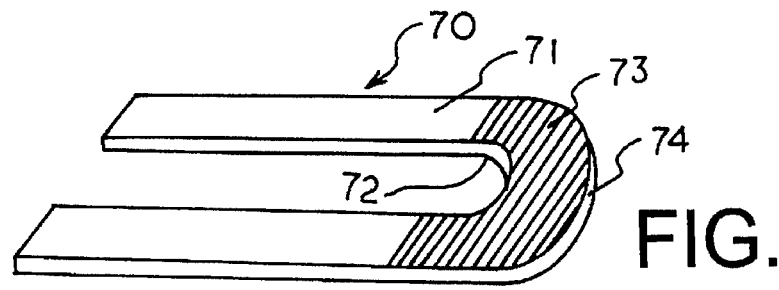
FIG. 38A is a perspective view of one form of a rectangular cross-section strip form of sensor.

FIGS. 38, 39 and 40 illustrate other forms of fiber sensors having normal circular cross-sections.

Figure 38B:
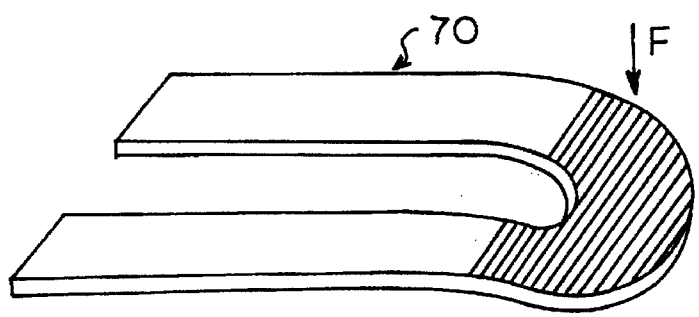
FIG. 38B illustrates the sensing deflection of the sensor of FIG. 38A.

In FIG. 38 a sensor 70 is formed from a flat strip having a rectangular cross-section. It has two opposed wide flat surfaces or sides 71 and 72. The strip is bent into a U-shape, in the Example, in a plane parallel to the flat surfaces 71 and 72. A light emission surface 73 is formed on one of the flat surfaces, surface 71, at the curve 74, and in use a sensor deflects in a direction normal to the flat surface 71 as indicated by arrow F. This deflection or curvature is out of the plane of the fiber, and is illustrated in FIG. 38B.

Figure 39A:
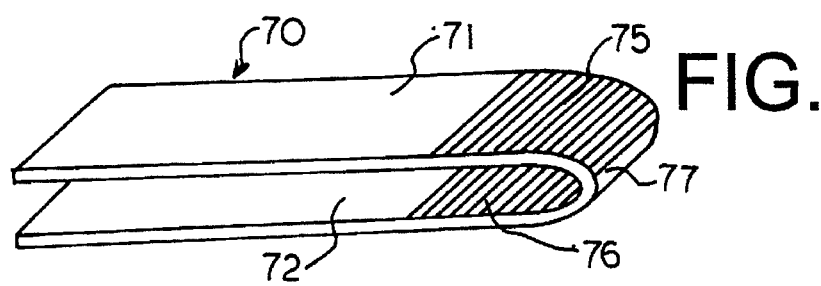
FIG. 39A is a perspective view of an alternative form of a rectangular cross-section strip.
Figure 39B:
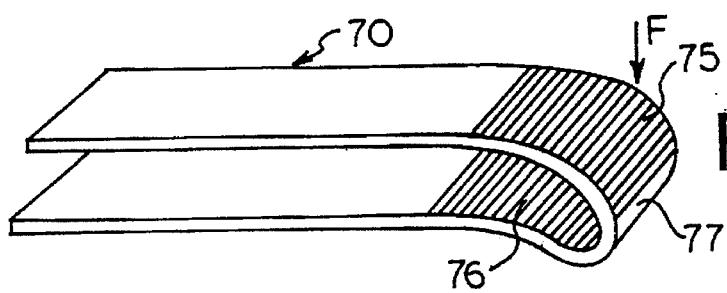
FIG. 39B illustrates the sensing deflection of the sensor in FIG. 39A.
Figure 39C:
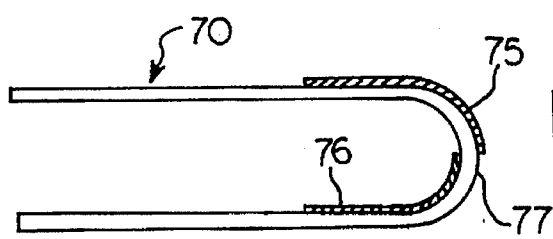
FIG. 39C is a side view of the sensor in FIG. 39A.

In FIG. 39A, the sensor 70 is again formed from a flat strip having a rectangular cross-section, with opposed, spaced-apart, wide flat surfaces or sides 71 and 72. In this Example the strip is bent into a U-shape in a plane normal to the planes of the surfaces 71 and 72. Light emission surfaces 75, 76 are formed on each of the surfaces 71 and 72, adjacent to the bend 77. The emission surfaces face in the same direction, as seen in FIG. 39C particularly. The deflection is illustrated in FIG. 39B.

FIG. 40A illustrates a fiber sensor 80, with a D-shaped cross-section as seen in FIG. 40B. In this Example, the fiber is bent in a U-shape, in a plane parallel to a flat surface 81 of the fiber, the bend indicated at 82. A light emission surface 83 is formed on the flat surface 81 at the bend 82. The deflection of the sensor would normally be downward out of the plane of the surface 81, as indicated at the dotted outline 80A.

Rectangular cross-sections, or similar cross-sections, have certain advantages. They can provide very efficient modulation of light by bending, as a fiber having one predominant mode can be used. Virtually all of the light can be made to intercept the emission surface.

Figure 41:
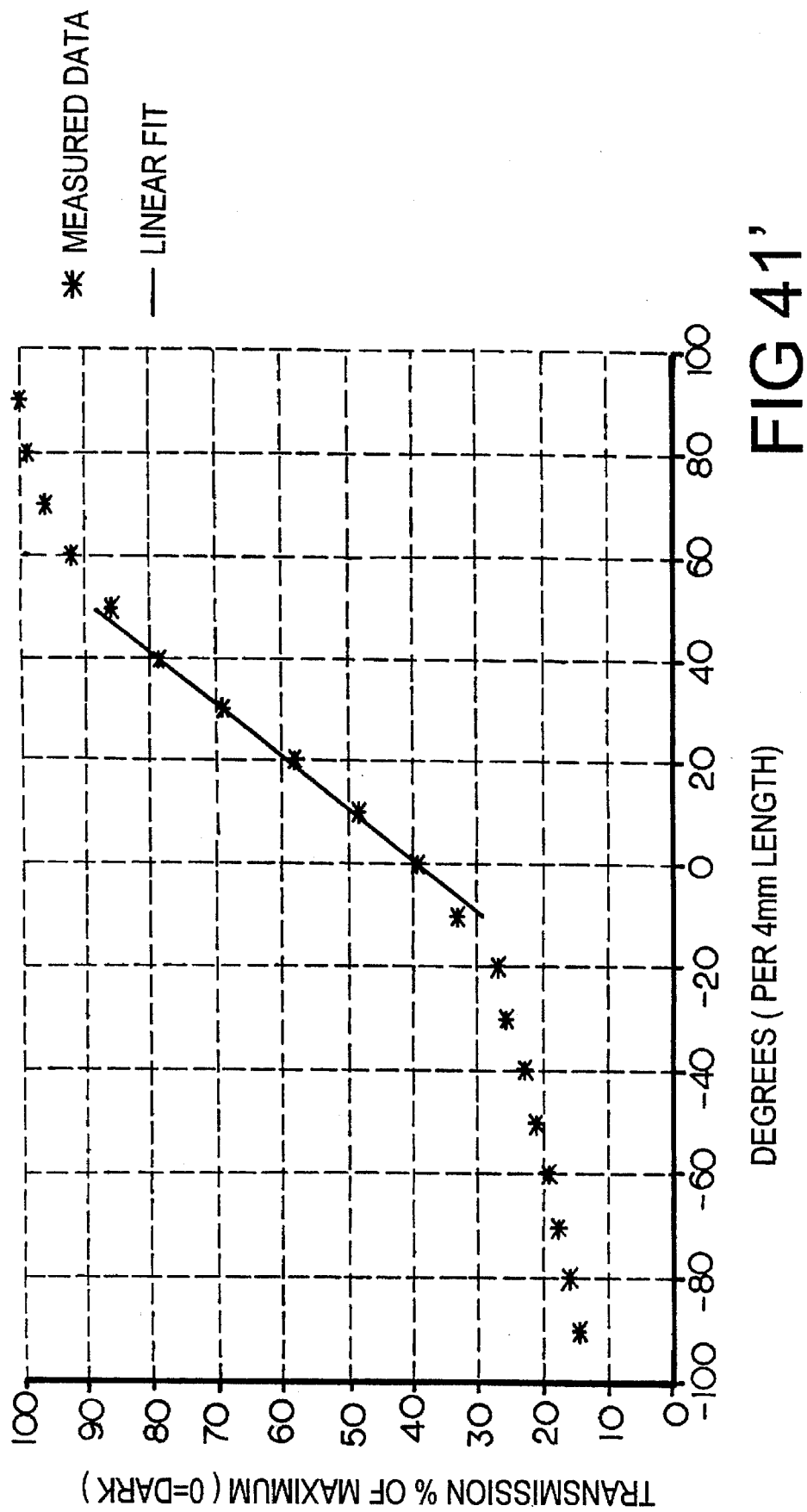
FIG. 41 is a plan view of an alternative form of a rectangular cross-section strip.

FIG. 41 illustrates another sensor made of a flat strip having a rectangular cross-section. It has two opposed wide flat surfaces 71 and 72 and a light emission surface or surfaces 84 and 85 on the same surface, in this case surface 71. In this example the strip is bent into a U-shape but in such a way that the long axis of its cross-section is perpendicular at section Q–Q' compared to the orientation of said long axis at section R–R'. To maintain it in this shape but with minimal effect on bending in a plane perpendicular to the plane of the U-shape, a thin rigid bar or bars 86 may be attached to the sensor adjacent to where the orientation of the cross-section begins to change.

FIG. 41' is a graph of the light throughput of a sensor like the one in FIG. 41. In this case the sensor was made of a strip of optically clear polymer, with a cross-section of 0.18 mm×1 mm and a total length of 130 mm. The rigid bar had a cross-section of 0.8 mm×0.2 mm and was 3 mm long. It was placed with its greatest width flat against the optical strip, 4 mm from the apex of the loop. The structure was held in a fixture, such that the loop was free to flex out of the plane of the loop in a roughly circular arc. The horizontal axis in the Figure indicates curvature of the loop, expressed as a total angular deflection from a planar (non-deflected) loop, per 4 mm (the approximate length of the region of the loop allowed to flex, measured along the axis of symmetry of the loop). The vertical axis indicates light transmission through the light guide expressed as a percentage of the maximum transmission measured during the test, where zero transmission corresponds to no light travelling through the light guide. The graph shows the ability to achieve a sensor with a linear range which extends substantially into a region of curvature such that increasing curvature produces increasing light transmission.

FIG. 42 shows a curvature or displacement sensor 87 on fiber 89 affixed to a bending beam 88. The bending beam is situated with one end 90 attached to a reference structure 91. Arm 92 pivots relative to the reference structure on hinge 93. Spring 94 is attached under tension to the pivot arm by means of pin attachments 95. This arrangement is used to measure the pivot angle of arm 92 by means of transmitting its angular displacement to the bending beam 88, in such a way that extraneous movement of pivot arm 92, such as end-to-end displacement, minimally affects the curvature of said beam. Alternatively, the spring may be replaced by a shear pad or other structure that minimizes the number of mechanical modes transmitted to said beam. This method of attachment is useful in applications such as automotive suspension height measurement and is preferable to the use of a secondary bean at right angles to primary beam, as in Y and T.

In the case of light guides with a cross-section that is rectangular or otherwise non-circularly symmetric, if the modes entering the loop (not counting the mode-modulating effects of the surfaces) are weighted toward being in the plane of the loop, then it is best to apply bends to the assembly within the plane of the loop. This is normally also the plane of greatest flexibility for deflections. The emission surfaces then logically must be perpendicular to the plane of the loop, and must face such that all undergo curvatures of the same sign. In this case this is the optimum configuration because the predominant modes are those affected by the modulation, regardless of loop geometry. In the case of non-circularly symmetric light guides where one mode substantially outweighs all others, there is little chance of mode-mixing downstream of the emission surface or surfaces, so that the surfaces need not be placed on or near the loop to achieve optimum modulation. An example of such a sensor light guide would be a thin strip of clear optical polymer with a rectangular cross-section, such that the major axis of the cross-section is perpendicular to the plane of the loop. If the loop is in the plane of the paper, apex facing right, then all the emission surfaces would be placed on sides of the light guide which face, e.g., the top (alternatively all face the bottom) of the paper.

The response of sensors is explained in the following way:

Light rays travel along fiber optics throughout a range of angles limited by the difference in index of refraction between the core and the cladding. For straight fibers, some light rays pass through the emission band. As a fiber with the emission band at the top bends downward, more of the rays impinge on the band at angles capable of passing through the surface, either by diffusion or by direct transmission. As the fiber bends upward, fewer rays will impinge on the band, and will be at shallow angles to its surface, so that more of them stay within the fiber, refracting from the untreated core/cladding boundary toward the fiber outside the sensor region. Bends at right angles to the axis of maximum sensitivity change to a minimum degree the amount of light striking the emission band, so there is virtually no change in transmitted light.

The width of the emission band around the circumference of the fiber will determine the sensitivity of the fiber to bends, with wider bands producing a larger percentage change per degree of bend. However, very wide bands will tend to increase the sensitivity to bends in the axis of minimum sensitivity. Typical sensors have emission bands that cover 5° to 30° of the circumference of the fiber, but other values will work. The length of the emission band can vary. It can be any length from millimetres to meters but there is less gain in sensitivity for long lengths, than expected. There is an optimum length for the strip, which is a function of the diameter of the fiber, its emission band width, and the minimum linear deflection angle desired. For 1 mm fibers, the optimum is about 25–50 mm, and for 200 micron fibers, it is about 10–20 mm. Long sensors can be formed by alternating lengths of fibers with an emission strip with lengths of fully clad fibers. Short sensors will be less sensitive, but more specific as to location of bend along the length of the member to which they are attached. However very short sensors can be made, such as 8 mm sensors on 125 micron fibers.

Sensors in accordance with the invention have various advantages, and useful characteristics. No special electronics are required to measure interference patterns, it is only necessary to measure the amount of light transmitted. Cost is orders of magnitude below that for interference (OTDR) techniques. Sensitivity is in the same range as that of resistance strain gauges. For many situations, particularly when the sensors are mounted near the neutral axis of a bending beam, changes in signal per microstrain are greater than those for resistance strain gauges, as measured in percent. The linear range is very large. They are particularly suited to measurement of bending in aircraft wings, helicopter blades, machinery, robot arms, or large structures. They are not affected by temperature, since measurement is not dependent on small changes in length of the fiber or its sensing portion. This is a distinct advantage over resistance strain gauges, which have a relatively narrow range of temperature sensitivity unless compensated, and over interference techniques, which are affected even more by temperatures than are resistance gauges. They can be used to measure position, with a large dynamic range.

While the above are descriptions of various preferred embodiments of the invention, various modifications should be obvious to those skilled in the art. For example, the sensor may be used with virtually any wavelengths or light including broadband or discrete spectra. Various referencing methods may be used, including a separate untreated fiber that is used to send light from the sensor light source over a similar path as the sensor fiber, the intensity of said light being used to perform differential or ratio compensation for common mode errors such as variations in fiber transmission or light source intensity. The reference path may also be used to automatically adjust the source light intensity to a fixed level. The invention is also meant to allow for emission surfaces that allow light loss at one wavelength or band of wavelengths but not at another wavelength or band of wavelengths. Thus, a two wavelength referencing method could be used over the same fiber, wherein light loss due to curvature is sensed with one wavelength and the other is used to provide reference information for compensation for common mode errors. Also, the light path may be chopped or modulated to provide improved sensitivity, if necessary. The output of the sensor may be used to measure parameters over a large range, or to determine a switching level. The sensors may be used for measurement, or form a part of a control loop. The sensor fiber may be attached to a substrate that is undergoing bending, or the fiber alone, supported by two or more parts whose deflection is being measured, may be the element being bent. Consequently, the description should not be used to limit the scope of the invention.

I claim:

1. A fiber optic bending and position sensor comprising a fiber optic light guide having a peripheral surface and having at least one curved light emission surface extending for part of the length of said light guide, said at least one curved light emission surface extending at said peripheral surface in a direction selected from (a) extending around said peripheral surface, (b) extending in an axial direction along said peripheral surface at a curved portion of said light guide and including means for injecting a light beam into an end of said light guide and means for detecting said light beam after it has passed the light emission surface zone.

2. A sensor as claimed in claim 1, wherein the light emission surface or surfaces are positioned to give a maximum change in light intensity transmitted through the fiber optic light guide when said sensor is bent in a selected plane.

3. A sensor as claimed in claim 1 including means for measuring the difference in intensity of said light beam between said one end and said other end of said light guide.

4. A sensor as claimed in claim 3 including display means for indicating any said difference in intensity of said light beam as a bending or displacement of said light guide.

5. A sensor as claimed in claim 1 including a further fiber optic light guide positioned alongside said fiber optic light guide, said further light guide having an unbroken cladding layer and forming a reference light guide.

6. A sensor as claimed in claim 1 having said at least one curved light emission surface covered by a light absorbent material.

7. A sensor as claimed in claim 1 comprising a fiber optic light guide in the form of a loop, the loop having said curved light emission surface therein.

8. A sensor as claimed in claim 7, wherein the loop has a plurality of curved light emission surface regions therein.

9. A sensor as claimed in claim 8, wherein said curved light emission surface regions in the curved loop comprise peripherally-oriented bands grouped on an inside or concave portion of the curvature of the loop.

10. A sensor as claimed in claim 9 having three to five peripherally-oriented bands grouped together, with the bands each extending for about 60° to about 90°.

11. A sensor as claimed in claim 8, wherein said curved light emission surface regions in the curved loop comprise axially-oriented bands with their axial edges substantially in a plane parallel to the planes described by the uppermost and lowermost reaches of said loop and following the curvature of the loop.

12. A sensor as claimed in claim 11 having from two to six curved bands in parallel planes.

13. A sensor as claimed in claim 7, wherein said light emission surface is positioned to gain a maximum change in light intensity transmitted through the fiber optic light guide when said sensor is bent in a selected plane.

14. A sensor according to claim 1, wherein the sensor is a suspension sensor comprising a flexible beam, said fiber optic bending and position sensor mounted on said flexible beam.

15. The sensor of claim 1 in which at least a portion of said fiber optic light guide is in the form of a single fiber which serves both to illuminate said at least one light emission surface and to collect illumination which has passed said at least one light emission surface, the illumination and collection end or ends of the fiber being located in a single region remote from the light emission surface or surfaces.

16. The sensor of claim 15, wherein the single fiber forms a loop, at least a portion of the light emission surface is in the loop, and the apex of the loop is at the distal extremity remote from said single region.

17. A fiber optic bending and position sensor comprising a fiber optic light guide having at least one curved light emission surface extending for part of the length of said light guide, said at least one curved light emission surface comprising at least one band extending peripherally of said light guide including means for injecting a light beam into an end of said light guide and means for detecting said light beam at the other end of said light guide.

18. A sensor as claimed in claim 17 having the light emission surface in the form of a plurality of spaced apart peripherally-oriented bands covered with a light-absorbing material.

19. A fiber optic bending and position sensor comprising a fiber optic light guide having at least one curved light emission surface extending for part of the length of said light guide, said curved light emission surface comprising at least one band extending axially at a curved portion of said light guide including means for injecting a light beam into an end of said light guide and means for detecting said light beam at the other end of said light guide.

20. A sensor as claimed in claim 19 wherein said fiber optic light guide has a rectangular cross-section, with said at least one curved light emission surface being on at least one side of said cross-section at a curved portion of said light guide and each said emission surface being covered with a light-absorbing material.

21. A sensor as claimed in claim 20, said rectangular cross-section being oblong and including two spaced parallel wide sides, said at least one curved light emission surface on one of said wide sides.

22. A sensor as claimed in claim 21, wherein said light guide is bent into a U-shape on a plane parallel to planes of said wide sides, said bend forming said curved portion.

23. A sensor as claimed in claim 21, said light guide being bent into a U-shape in a plane normal to said planes of said wide sides, said bend forming said curved portion.

24. A sensor as claimed in claim 23 with a light emission surface on each of said wide sides, at said bend.

25. A sensor as claimed in claim 19 wherein said fiber optic light guide has a D-shaped cross-section, having a flat surface on one side, said light emission surface being formed on said flat surface.

26. A method of sensing curvature and displacement of an elongate member, comprising:

attaching a fiber optic light guide to said elongate member, said light guide having a peripheral surface and having a curved light emission surface on said peripheral surface and extending for part of the length of said light guide, said curved light emission surface extending in a direction selected from (a) extending peripherally around said peripheral surface, (b) extending axially along said peripheral surface at a curved portion of said light guide;

injecting a light beam into one end of said light guide;

detecting said light beam at the other end of said light guide;

measuring the difference in intensity of said light beam between said one end and said other end; and indicating bending, or displacement, of said elongate member.

27. The method of claim 26 including attaching a plurality of fiber optic light guides to said elongate member, each light guide having a plurality of light emission surfaces, said light emission surfaces on each individual light guide being positioned to give a maximum change in light intensity transmitted through said individual light guide when said elongate member is bent in a unique selected plane.

28. The method as claimed in claim 27 utilizing two to six fiber optic light guides, said surfaces oriented in different directions at predetermined angles relative to each other.

29. The method as claimed in claim 26 including attaching a further fiber optic light guide alongside said fiber optic light guide, said further fiber optic light guide acting as a reference light guide.

30. The method of claim 26 which includes selecting the size, shape and orientation of each of the emission surfaces of the light guide so as to optimize sensing of curvatures, including curvature changes that produce increasing transmission of light with increasing curvature.

31. The method of claim 26 which includes the use of shear elements or springs between at least one end portion of said elongate member and a moveable member, the displacement of which it is desired to be measured, to communicate displacement to the elongate member, such that curvature of said elongate member maximally represents the moveable member displacement to be measured.

32. A fiber optic bending and position sensor comprising, a fiber optic light guide in the form of a loop having a tight curve portion, with at least one curved light emission surface substantially on said tight curve portion, the size and positioning of the light emission surface being selected to increase sensitivity to deformation, means for injecting a light beam into one end of said light guide and means for detecting the light beam after it has passed the light emission surface zone.

33. The sensor of claim 32 wherein the light emission surface covers only part of the circumference, is axially-extending and covered by a light-absorbing material, the tight curve portion forms a semi-circular shape, and a deformation to be sensed tends to deform or deflect the semi-circular shaped portion.

* * * * *